US012476068B2

(12) United States Patent
He et al.

(10) Patent No.: US 12,476,068 B2
(45) Date of Patent: Nov. 18, 2025

(54) DEVICES FOR RADIATION RAY GENERATION AND RADIATION APPARATUSES

(71) Applicant: SHANGHAI UNITED IMAGING HEALTHCARE CO., LTD., Shanghai (CN)

(72) Inventors: Shoubo He, Shanghai (CN); Wei Han, Shanghai (CN); Yanfang Liu, Shanghai (CN); Cheng Ni, Shanghai (CN); Feichao Fu, Shanghai (CN); Qi Wang, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 350 days.

(21) Appl. No.: 18/060,494

(22) Filed: Nov. 30, 2022

(65) Prior Publication Data

US 2023/0215680 A1 Jul. 6, 2023

(30) Foreign Application Priority Data

Dec. 31, 2021 (CN) ......................... 202111666049.7

(51) Int. Cl.
*H01J 35/12* (2006.01)

(52) U.S. Cl.
CPC ......... *H01J 35/12* (2013.01); *H01J 2235/086* (2013.01); *H01J 2235/088* (2013.01); *H01J 2235/1204* (2013.01); *H01J 2235/1262* (2013.01); *H01J 2235/1295* (2013.01)

(58) Field of Classification Search
CPC ................. H01J 35/12; H01J 2235/086; H01J 2235/088; H01J 2235/1204; H01J 2235/1262; H01J 2235/1295
See application file for complete search history.

(56) References Cited

U.S. PATENT DOCUMENTS

| | | | | |
|---|---|---|---|---|
| 4,143,275 A * | 3/1979 | Mallozzi | A61N 5/1001 | 378/145 |
| 6,463,123 B1 | 10/2002 | Korenev | | |
| 6,882,705 B2 * | 4/2005 | Egley | H01J 35/13 | 378/143 |
| 2002/0101958 A1 * | 8/2002 | Bertsche | H01J 35/13 | 378/65 |
| 2005/0213711 A1 | 9/2005 | Ukita | | |

OTHER PUBLICATIONS

S. Korenev, Target for Production of X-Rays, Proceedings of the 2003 Particle Accelerator Conference, 1614-1615, 2003.

* cited by examiner

*Primary Examiner* — Chih-Cheng Kao
(74) *Attorney, Agent, or Firm* — METIS IP LLC

(57) ABSTRACT

The present disclosure provides a device and an equipment for radiation ray generation. The device may include: a radiation target assembly configured to generate radiation rays under irradiation of an electron beam with a predetermined energy; and a heat dissipation assembly arranged on a back surface of the radiation target assembly, wherein a range of a thickness of the target assembly may be determined based on a peak of energy deposition of a target material of the radiation target assembly under the irradiation of the electron beam with the predetermined energy.

20 Claims, 9 Drawing Sheets

900

DEVICES FOR RADIATION RAY GENERATION AND RADIATION APPARATUSES

CROSS-REFERENCE TO RELATED APPLICATIONS

This application claims priority to Chinese Patent Application No. 202111666049.7, filed on Dec. 31, 2021, the contents of which are incorporated herein by reference in their entirety.

TECHNICAL FIELD

The present disclosure relates to the field of radiation ray, in particular, to a device for radiation ray generation.

BACKGROUND

In the electron linear accelerator, a radiation target is configured to generate X-rays for treatment by reacting a bremsstrahlung with electrons emitted from an accelerator tube. The radiation target may be a composite target, that is covered by a thermal conductive material. The target material of the radiation target may be configured to generate photons under irradiation of the electron beam. The thermal conductive material may be used for transfer of heat generated in the radiation target, reducing the temperature of the target, and absorbing the unreacted electrons, thereby reducing the electron leakage. It is desired to provide a device for radiation ray generation with improved stability and longer service life, sufficient dose rate, and less electron.

SUMMARY

One aspect of the present disclosure may provide a device for radiation ray generation. The device may include a radiation target assembly configured to generate radiation rays under irradiation of an electron beam with a predetermined energy; and a heat dissipation assembly thermally connected with the radiation target assembly, wherein a range of a thickness of the radiation target assembly may be determined based on a peak of energy deposition of a target material of the radiation target assembly under the irradiation of the electron beam with the predetermined energy.

In some embodiments, the thickness of the radiation target assembly may be the same as a depth in the target material of the radiation target assembly at the peak of the energy deposition of the target material of the radiation target assembly under the irradiation of the electron beam with the predetermined energy.

In some embodiments, a range of a ratio of a thickness of the heat dissipation layer to the thickness of the radiation target assembly may be 1:33:1.

In some embodiments, the radiation target assembly may include one or more target material layers, the heat dissipation assembly may include one or more heat dissipation layers, at least one of the one or more heat dissipation layers being arranged on a surface of one of the one or more target material layers that is not under irradiation of an electron beam.

In some embodiments, the surface of the one of the one or more target material layers may include a first concave-convex surface, the first concave-convex surface may be axially symmetrical with respect to a central axis of the radiation target assembly, and the at least one of the one or more heat dissipation layers may include a second concave-convex surface matched with the first concave-convex surface.

In some embodiments, the one or more target material layers may be arranged along a thickness direction, at least one of the one or more heat dissipation layers may be arranged between two target material layers among the one or more target material layers.

In some embodiments, a thickness of one of the one or more target material layers may not be less than 0.1 mm.

In some embodiments, a range of a ratio of a thickness of one of the one or more target material layers to a thickness of one of the one or more heat dissipation layers may be 1:5~1:1.

In some embodiments, the device may further include a second radiation target assembly thermally connected with one of the one or more heat dissipation layers away from each of the one or more target material layers of the radiation target assembly.

In some embodiments, a target material of the second radiation target assembly may be the same as the target material of the radiation target assembly, and a total thickness of the target material of the second radiation target assembly may be determined based on a peak of a radiation dose rate of the target material of the second radiation target assembly.

In some embodiments, a sum of a total thickness of the target material of the second radiation target assembly and a total thickness of the target material of the radiation target assembly may be not less than a thickness of the target material of the radiation target assembly corresponding to a peak of a radiation dose rate of the target material of the radiation target assembly or not less than a thickness of the target material of the second radiation target assembly under the irradiation of the electron beam with the predetermined energy.

In some embodiments, the total thickness of the target material of the second radiation target assembly may be not larger than 4 times of the thickness of the second radiation target assembly corresponding to the peak of the radiation dose rate of the target material of the second radiation target assembly under the irradiation of the electron beam with the predetermined energy.

In some embodiments, the one or more target material layers of the radiation target assembly may be arranged along a radial direction, and at least one of the one or more heat dissipation layers may surround one of the one or more target material layers.

In some embodiments, a minimum inner diameter of at least one of the one or more heat dissipation layers may be determined by a diameter of a spot generated by the electron beam irradiated on the radiation target assembly.

In some embodiments, a range of a diameter of one of the one or more target material layers located in a central region of the radiation target assembly may be 0.15~0.25.

In some embodiments, a range of a ratio of a radial size of one of the one or more heat dissipation layers to a radial size of one of the one or more target material layers may be 2:1~3:1.

In some embodiments, the device may further include a second heat dissipation assembly including one or more second heat dissipation layers.

In some embodiments, a range of a ratio of one of a thermal conductivity of the target material of the radiation target assembly and a thermal conductivity of the target material of the second radiation target assembly to one of a thermal conductivity of the material of one of the one or more heat dissipation layer and a thermal conductivity of the material of one of the one or more second heat dissipation layer may be 1:3~1:10.

In some embodiments, a range of a ratio of one of a photon dose rate of the target material of the radiation target assembly or a photon dose rate of the target material of the second radiation target assembly to one of a photon dose rate of the material of one of the one or more heat dissipation layer or a photon dose rate of the material of one of the one or more second heat dissipation layer may be 1:0.5~1:0.9.

Another aspect of the present disclosure may provide a radiation apparatus. The radiation apparatus may include an electron beam emission device configured to generate an electron beam with a predetermined energy; and a device for radiation ray generation, including: a radiation target assembly configured to generate radiation rays under irradiation of an electron beam with a predetermined energy; and a heat dissipation assembly thermally connected with the radiation target assembly, wherein a range of a thickness of the radiation target assembly may be determined based on a peak of energy deposition of a target material of the radiation target assembly under the irradiation of the electron beam with the predetermined energy.

BRIEF DESCRIPTION OF THE DRAWINGS

The present disclosure is further illustrated in terms of exemplary embodiments, and these exemplary embodiments are described in detail with reference to the drawings. These embodiments are not limited. In these embodiments, the same numeral indicates the same structure, wherein.

DETAILED DESCRIPTION

Figure 1:
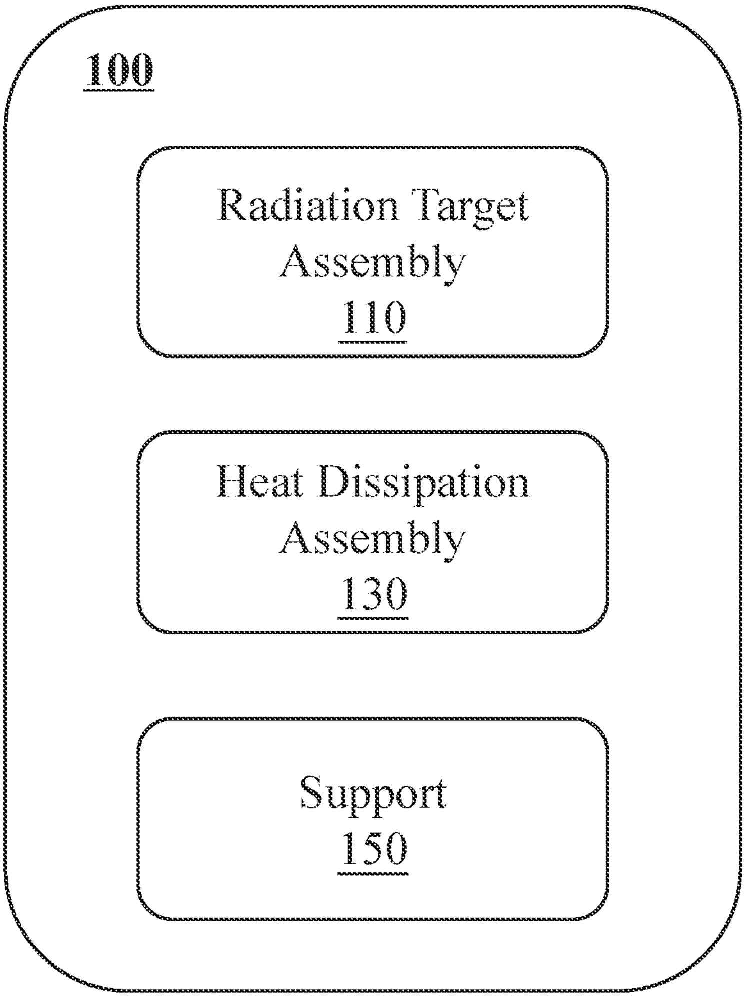
FIG. 1 is a block diagram illustrating an exemplary device for radiation ray generation according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

It will be understood that the terms "system," "device," "unit," and/or "module" used herein are one method to distinguish different components, elements, parts, sections, or assemblies of different levels in ascending order. However, the terms may be displaced by other expressions if they may achieve the same purpose.

As shown in the present disclosure and claims, unless the context clearly indicates exceptions, the words "a," "an," "one," and/or "the" do not specifically refer to the singular, but may also include the plural. The terms "including" and "comprising" only suggest that the steps and elements that have been clearly identified are included, and these steps and elements do not constitute an exclusive list, and the method or device may also include other steps or elements.

The flowcharts used in the present disclosure may illustrate operations executed by the system according to embodiments in the present disclosure. It should be understood that a previous operation or a subsequent operation of the flowcharts may not be accurately implemented in order. Conversely, various operations may be performed in inverted order, or simultaneously. Moreover, other operations may be added to the flowcharts, and one or more operations may be removed from the flowcharts.

A device for radiation ray generation is mainly used to generate radiation rays, such as X-rays. The device for radiation ray generation is mainly used in a medical electronic linear accelerator, an X-ray machine in security, or other equipment. Since the device for radiation ray generation may generate photons based on the irradiation of an electron beam on a target material of the device, the deposited energy in the target may be high, and the temperature of the target may also be high, which is easy to cause an oxidation of the target, and the service life of the target may not be long. The device for radiation ray generation described in the embodiments of the present disclosure may mainly include: a radiation target assembly configured to generate radiation rays under irradiation of an electron beam with a predetermined energy; and a heat dissipation assembly arranged on a back surface of the radiation target assembly, wherein a range of a thickness of the target assembly may be determined based on a peak of energy deposition of a target material of the radiation target assembly under the irradiation of the electron beam with the predetermined energy. The thickness of the radiation target assembly is determined by the peak of the energy deposition of the target material of the radiation target assembly under the irradiation of the electron beam with the predetermined energy, so that the energy deposition of target material of the radiation target assembly with a depth in the target material of the radiation target assembly at the peak of the energy deposition of the target material of the radiation target assembly is concentrated near a back surface of the radiation target assembly opposite to an irradiation surface. When the heat dissipation assembly is set on the back surface of the radiation target assembly, a distance between the heat dissipation assembly and a position with the highest temperature in the radiation target assembly may be effectively reduced, and a heat dissipation ability of the heat dissipation assembly for the radiation target assembly may be enhanced, thus the service life of the device for radiation ray generation may be increased.

FIG. 1 is a block diagram illustrating an exemplary device for radiation ray generation according to some embodiments of the present disclosure. The device for radiation ray generation may include one or more radiation target assemblies 110, one or more heat dissipation assemblies 130, and a support. The one or more radiation target assemblies 110 may be thermally connected with the one or more heat dissipation assemblies 130. For example, each of the one or more radiation target assemblies 110 may be thermally connected with one of the one or more heat dissipation assemblies 130. As another example, each of the one or more radiation target assemblies 110 may be thermally connected with all of the one or more heat dissipation assemblies 130. As still another example, two of the one or more radiation target assemblies 110 may be thermally connected with one of the one or more heat dissipation assemblies 130.

In some embodiments, the count of the one or more radiation target assemblies 110 may be the same as the count of the one or more heat dissipation assemblies 130. In some embodiments, the count of the one or more radiation target assemblies 110 may be different from the count of the one or more heat dissipation assemblies 130. For example, the count of the one or more radiation target assemblies 110 may exceed the count of the one or more heat dissipation assemblies 130.

More descriptions for the one or more radiation target assemblies 110 and the one or more heat dissipation assemblies 130 may be found elsewhere in the present disclosure (e.g., FIG. 4, FIG. 5A-FIG. 6B and the descriptions thereof).

The support 150 may be configured to provide support for components of the device 100, such as the one or more radiation target assemblies 110, the one or more heat dissipation assemblies 130, or any other components. In some embodiments, the support 150 may be configured to accommodate the one or more radiation target assemblies 110, the one or more heat dissipation assemblies 130. For example, the support 150 may include a substrate. In some embodiments, the substrate may include a baseplate. In some embodiments, the substrate may include a baseplate and a sidewall. The baseplate and the sidewall may form accommodation cavity for accommodating the one or more radiation target assemblies 110, the one or more heat dissipation assemblies 130. More descriptions for the support 150 may be found elsewhere in the present disclosure (e.g., FIG. 7 and the descriptions thereof).

Figure 2:
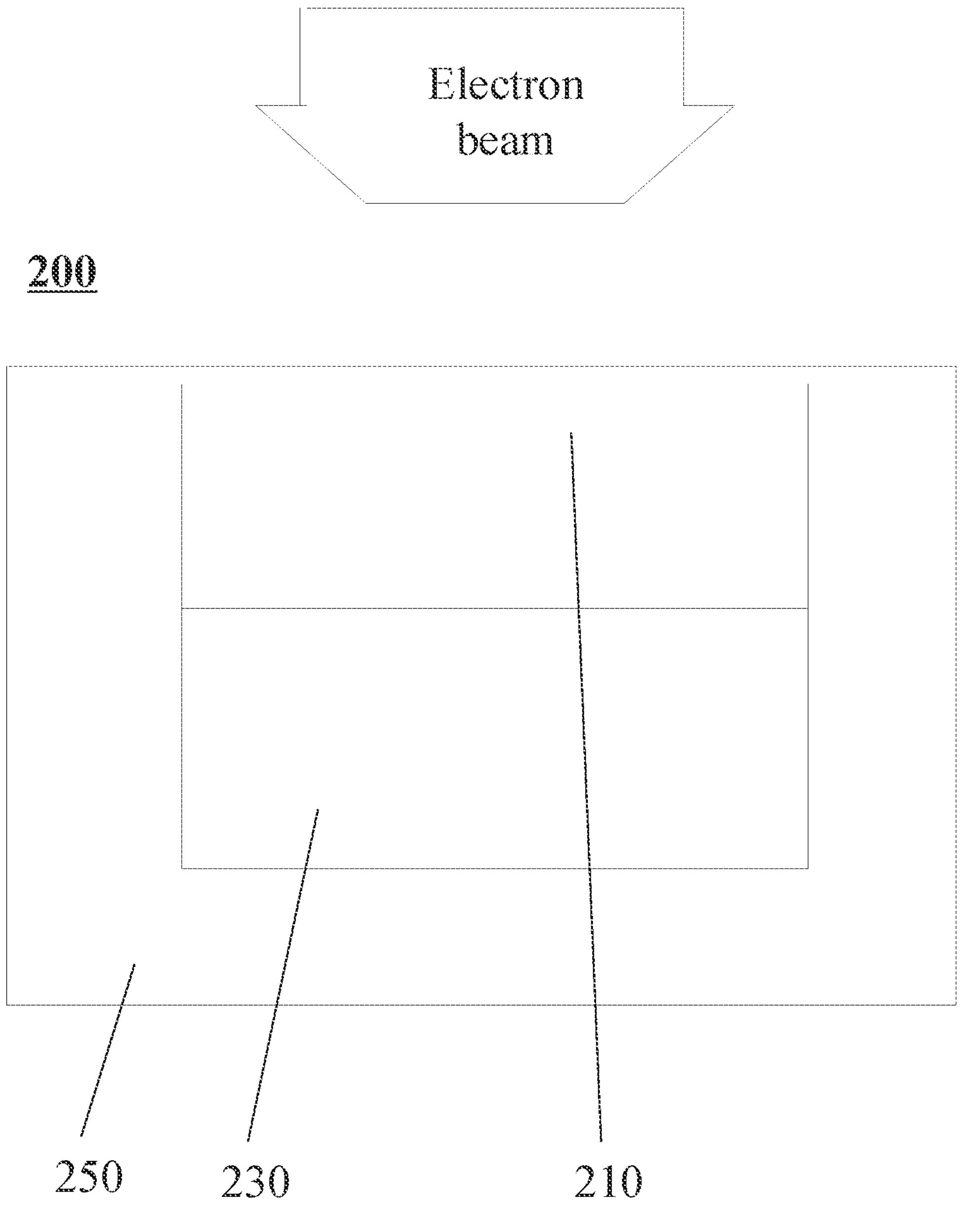
FIG. 2 is a schematic diagram illustrating an exemplary device for radiation ray generation according to some embodiments of the present disclosure.
Figure 8:
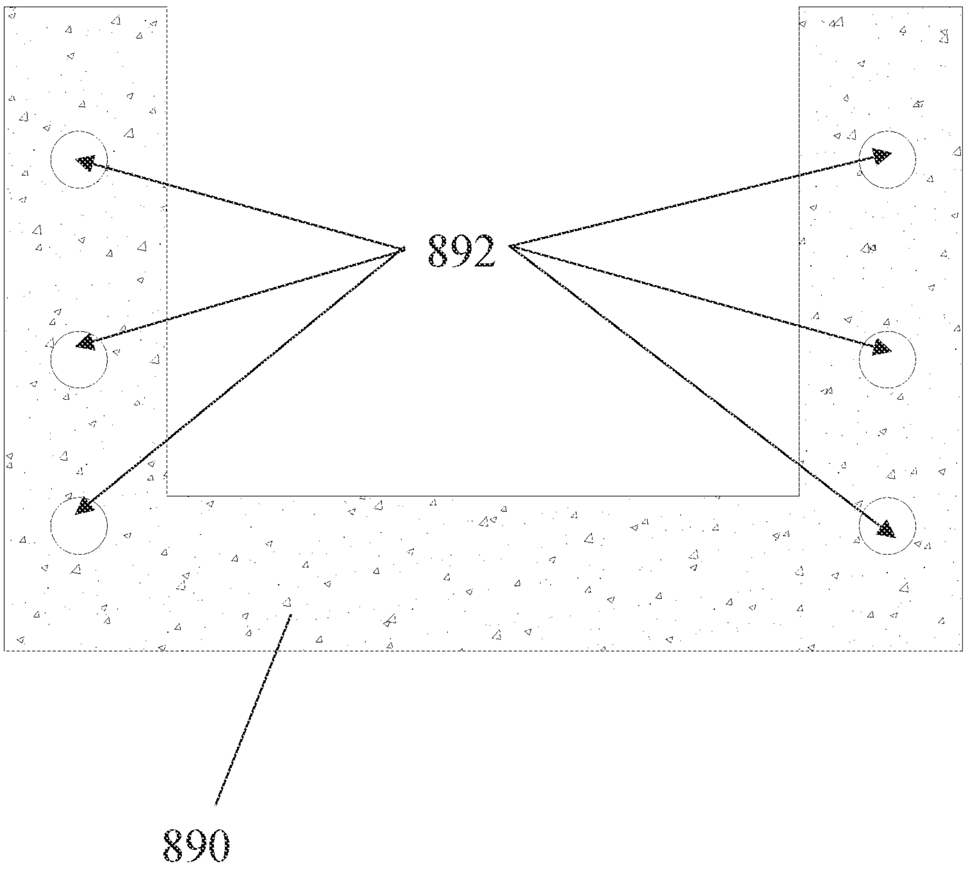
FIG. 8 is a schematic diagram illustrating another exemplary device for radiation ray generation according to some embodiments of the present disclosure.

More descriptions for the device for radiation ray generation may be found elsewhere in the present disclosure (e.g., FIG. 2 and FIG. 8 and the descriptions thereof).

FIG. 2 is a schematic diagram illustrating exemplary device for radiation ray generation according to some embodiments of the present disclosure. As shown in FIG. 2, the device 200 for radiation ray generation may include a radiation target assembly 210 and a heat dissipation assembly 230. The heat dissipation assembly 230 may be thermally connected with the radiation target assembly 210. The thermal connection may refer to an approach for heat transfer between different components or assemblies. In some embodiments, the thermal connection between the radiation target assembly 210 and the heat dissipation assembly 230 may be implemented by a way of physical connection. The radiation target assembly 210 may be used to generate radiation rays under irradiation of an electron beam with a predetermined energy. In some embodiments, the heat dissipation assembly 230 may be arranged on a back surface of the radiation target assembly 210. The heat dissipation assembly 230 may be used for heat dissipation of the radiation target assembly 210 to keep a temperature of the radiation target assembly 210 in a range, e.g., less than 1500° C. For example, the heat dissipation assembly 230 may be used to reduce the temperature of the radiation target assembly 210 when the radiation target assembly 210 is under irradiation of an electron beam with the predetermined energy. A thickness of the radiation target assembly 210 may be determined based on a peak of energy deposition of a target material of the radiation target assembly 210 under the irradiation of the electron beam with the predetermined energy, after a thickness of the radiation target assembly 210 is determined, the energy deposition generated by the radiation target assembly 210 may be concentrated near the back surface of the radiation target assembly 210. When the heat dissipation assembly 230 is arranged on the back surface of the radiation target assembly 210, a distance between the heat dissipation assembly and a position with the highest temperature in the radiation target assembly may be reduced, thus enhancing the heat dissipation ability of the heat dissipation layer. In some embodiments, the predetermined energy may refer to an energy predetermined for emitting the electron beam on the device 200. In some embodiments, the predetermined energy may be measured according to a voltage generating the electron beam. In some embodiments, the predetermined energy may be 1 MV-20 MV, preferably be 6 MV-15 MV.

As used herein, a surface of the radiation target assembly 210 irradiated by the electron beam may be defined as an irradiation surface. In an irradiation direction of the electron beam, a surface of the radiation target assembly 210 that is opposite to the irradiation surface may be defined as the back surface. A distance between the irradiation surface and the back surface may be a thickness of the radiation target assembly 210. The direction pointing from the irradiation surface to the back surface may be the thickness direction of the radiation target assembly 210.

In order to ensure a good heat dissipation efficiency of the heat dissipation assembly 230, a thickness of the heat dissipation assembly 230 may not be too thin. In order to ensure that the heat dissipation assembly 230 may not affect a dose rate of photons generated by the device for radiation ray generation, the thickness of the heat dissipation assembly 230 may not be too thick. In some embodiments, the thickness of the heat dissipation assembly 230 may be in a range of 0.2 mm~1 mm. In some embodiments, the thickness of the heat dissipation assembly 230 may be in a range of 0.4 mm~1 mm. In some embodiments, the thickness of the heat dissipation assembly 230 may be in a range of 0.6 mm~1 mm. In some embodiments, the thickness of the heat dissipation assembly 230 may be in a range of 0.4 mm~0.8 mm. Accordingly, the heat dissipation assembly 230 with the thickness as described in the present disclosure, the heat dissipation assembly may have good heat dissipation efficiency and not affect a dose rate of photons generated by the device for radiation ray generation.

In some embodiments, a ratio of the thickness of the heat dissipation assembly 230 to the thickness of the radiation target assembly 210 may be in a range of 1:3~3:1. In some embodiments, the ratio of the thickness of the heat dissipation assembly 230 to the thickness of the radiation target assembly 210 may be in a range of 1:1~3:1. In some embodiments, the ratio of the thickness of the heat dissipation assembly 230 to the thickness of the radiation target assembly 210 may be in a range of 1.5:1~3:1. In some embodiments, the ratio of the thickness of the heat dissipation assembly 230 to the thickness of the radiation target assembly 210 may be in a range of 2:1~3:1. In some embodiments, the ratio of the thickness of the heat dissipation assembly 230 to the thickness of the radiation target assembly 210 may be in a range of 2:1~2.5:1.

In some embodiments, the back surface of the radiation target assembly 210 may include a first concave-convex surface. The first concave-convex surface may be axially symmetrical with respect to a central axis of the radiation target assembly 210. The heat dissipation assembly 230 may include a second concave-convex surface matched with the first concave-convex surface. By matching the first concave-convex surface with the second concave-convex surface, a contact area between the radiation target assembly 210 and the heat dissipation assembly 230 may be increased, and a heat exchange ability between the radiation target assembly 210 and the heat dissipation assembly 230 may be enhanced, thereby improving the heat dissipation effect of the heat dissipation assembly 230 for the radiation target assembly 210.

In some embodiments, a shape of the first concave-convex surface may include a wave shape, a bulge shape, a zigzag shape, or the like. In some embodiments, the first concave-convex surface may include one or more concave regions and convex regions. In some embodiments, the concave regions and the convex regions of the first concave-convex surface may be spaced along a circumference of the radiation target assembly with an interval. In some embodiments, the concave regions and convex regions of the first concave-convex surface may also be spaced along a radial direction of the radiation target assembly with an interval.

The radiation target assembly may be the main functional assembly of the device 100, and may be used to receive the irradiation of the electron beam to generate photons, thereby generating radiation rays, such as X-rays.

In some embodiments, since the radiation target assembly 210 may need to be irradiated by an electron beam to generate photons, the target material of the radiation target assembly 210 may include a material with a great atomic number, such as molybdenum with an atomic number of 42, tungsten with an atomic number of 74, or the like. In the process of generating photons by the irradiation of the electron beam, a large amount of energy may be deposited on radiation target assembly 210, a temperature of the target material of the radiation target assembly 210 may rise accordingly, thus the target material may need a performance of high heat resistance. In some embodiments, the target material of the radiation target assembly 210 may include tungsten.

As the main heat dissipation component of the device 200, the heat dissipation assembly 230 may dissipate heat from the radiation target assembly 210, thereby reducing the temperature of the radiation target assembly 210, and preventing the temperature of the radiation target assembly 210 from reaching an oxidation temperature. Thus, the oxidation of the radiation target assembly 210 may be alleviated, and the service life of the device 200 may be improved.

Since the target material of the radiation target assembly 210 may have a certain thermal conductivity, in order to make the heat dissipation assembly 230 have sufficient thermal conductivity, in some embodiments, a range of a ratio of the thermal conductivity of the target material of the radiation target assembly 210 to the thermal conductivity of a material of the heat dissipation assembly 230 may be 1:3~1:10. In some embodiments, the range of the ratio of the thermal conductivity of the target material of the radiation target assembly 210 to the thermal conductivity of the material of the heat dissipation assembly 230 may be 1:5~1:10. In some embodiments, the range of the ratio of the thermal conductivity of the target material of the radiation target assembly 210 to the thermal conductivity of the material of the heat dissipation assembly 230 may be 1:5~1:8.

Since the heat dissipation assembly 230 may need to dissipate heat from the radiation target assembly 210, energy deposition generated by the heat dissipation assembly 230 may be less than energy deposition generated by the radiation target assembly 210, thus the material of the heat dissipation assembly 230 may include have a small atomic number. On the other hand, the material of the heat dissipation assembly 230 may also need a performance of high thermal conductivity to better conduct and dissipate the heat of the radiation target assembly 210. In some embodiments, the material of the heat dissipation assembly 230 may include copper or diamond.

In some embodiments, the material of the heat dissipation assembly 230 may be a material with a certain electronic absorption ability, and the electronic absorption ability of the material of the heat dissipation assembly 230 may be less than the electronic absorption ability of the target material of the radiation target assembly 210. In some embodiments, a range of a ratio of a photon dose rate of the target material of the radiation target assembly 210 to a photon dose rate of the material of the heat dissipation assembly 230 may be 1:0.5~1:0.9. In some embodiments, a range of the ratio of the photon dose rate of the target material of the radiation target assembly 210 to the photon dose rate of the material of the heat dissipation assembly 230 may be 1:0.6~1:0.9. In some embodiments, a ratio of a photon dose rate of the target material of the radiation target assembly 210 to a photon dose rate of the material of the heat dissipation assembly 230 may be 1:0.6~1:0.8. In some embodiments, the material of the heat dissipation assembly 230 may be copper. Since copper may generate photons after absorbing electrons, the heat dissipation assembly 230 may also increase a radiation dose rate of the device 200 to a certain extent while conducting heat dissipation.

In some embodiments, the heat dissipation assembly 230 may be made of diamond. Compared with copper, diamond has a better performance of thermal conductivity, so the heat dissipation assembly 230 using diamond may have a stronger heat dissipation ability. A periphery of the diamond may be provided with a metal material (such as copper) coating with a high thermal conductivity. The heat dissipation assembly 230 may be welded to a substrate through the metal material coating, to fix the heat dissipation assembly 230. On the other hand, the metal material coating may make the diamond and the substrate maintain an efficient thermal conductivity, so that the heat dissipation assembly 230 may quickly transfer the heat of the radiation target assembly 210 to the substrate, thereby radiating the heat to the outside, and enhancing a heat dissipation ability of the device 200.

In some embodiments, the radiation target assembly 210 may include a single-layer structure along the thickness direction, in other words, the target material of the radiation target assembly 210 may have one single layer. In some embodiments, the single-layer structure may be made of a material with a great atomic number. In some embodiments, the thickness of the radiation target assembly 210 may be the same or approximately the same as a depth in the target material of the radiation target assembly 210 at the peak of the energy deposition of the target material of the radiation target assembly 210 under the irradiation of the electron beam with the predetermined energy. Since the heat dissipation assembly 230 may be connected with the back surface of the radiation target assembly 210, a position of the heat dissipation assembly 230 on the back surface of the radiation target assembly 200 may be determined after the thickness of the radiation target assembly 210 is determined.

Figure 3:
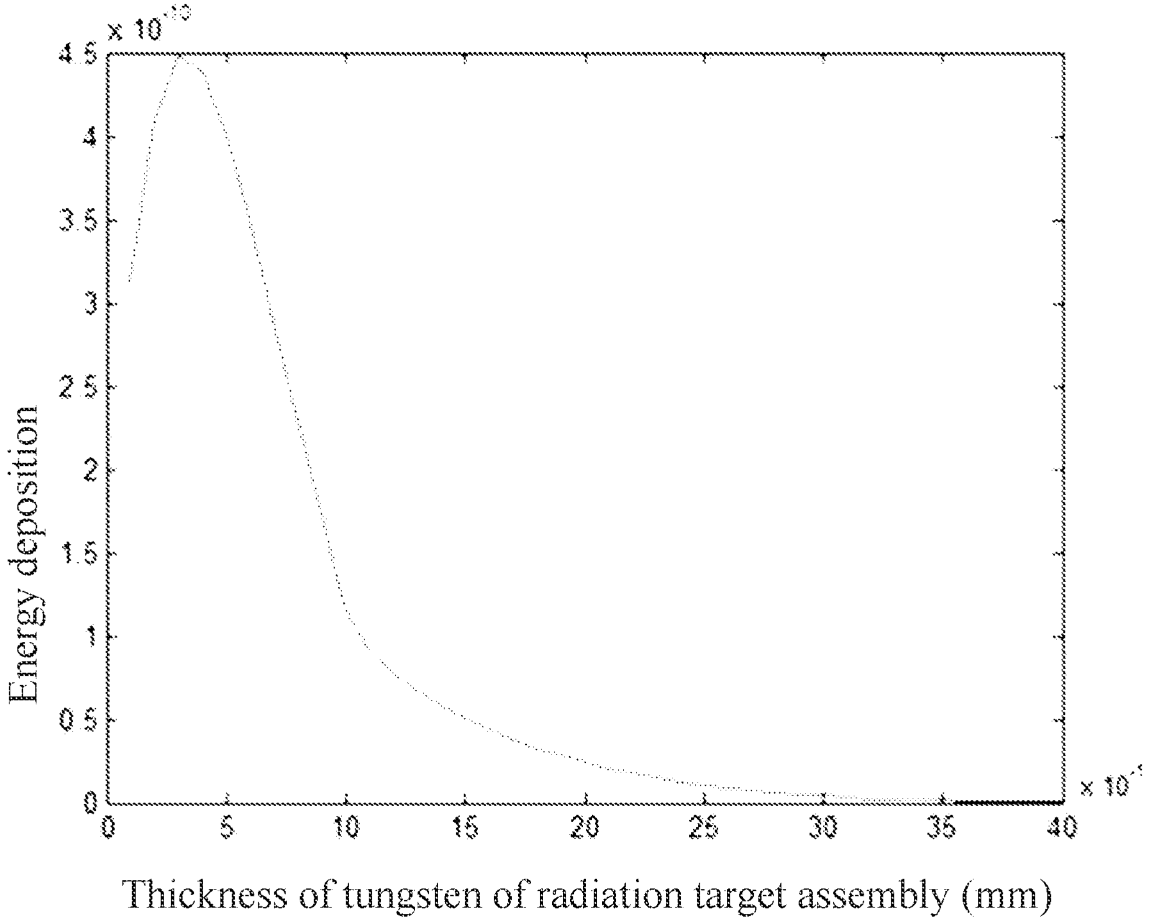
FIG. 3 is a schematic diagram illustrating an exemplary curve of energy deposition of a target material of a device for radiation ray generation according to some embodiments of the present disclosure.

FIG. 3 is a schematic diagram illustrating an exemplary curve of energy deposition of a target material of a device for radiation ray generation according to some embodiments of the present disclosure. The curve of energy deposition of a target material of a device for radiation ray generation denotes a change of the energy deposition of the target material of a device for radiation ray generation with the thickness of the target material. As shown in FIG. 3, an abscissa may represent a depth (measuring in a scale of millimeter) in the target material along an irradiation direction of the electron beam, and an ordinate may represent an energy deposition (measuring in a scale of Watt) of the target material with respect to a corresponding depth. As shown in FIG. 3, an energy deposition of the target material may change with a change of a depth in the target material. A depth in the target material of the radiation target assembly at a peak of the energy deposition of the target material of the radiation target assembly illustrated in the present disclosure may refer to a depth in the target material of the radiation target assembly along the irradiation direction at the peak of energy deposition in the curve of energy deposition of the target material of the adiation target assembly under the irradiation of the electron beam with the predetermined energy (e.g., 6 MV-15 MV). In some embodiments, the target material radiation may be separated into a plurality of target material layers in the thickness direction. When a total thickness of one or more target material layers (also referred to as a total thickness of the target material) of the radiation target assembly exceeds the depth in the target material of the radiation target assembly at the peak of the energy deposition, a position of the depth in the target material of the radiation target assembly at the peak of the energy deposition may be a position where the thickness of the target material of the radiation target assembly corresponds to the highest energy deposition. In some embodiments, the curve of energy deposition may be simulated using a Monte Carlo software. In some embodiments, as shown in FIG. 3, taking the target material of a radiation target assembly (e.g., the radiation target assembly 110 illustrated in FIG. 1, or the radiation target assembly 210 illustrated in FIG. 2) as tungsten as an example, under the irradiation of an electron beam with energy of 6 MV-15 MV, a depth in tungsten at the peak of energy deposition of tungsten may be 0.3 mm~0.5 mm. In some embodiments, a value of the peak of energy deposition may be a range, which is not less than 80% of a maximum of energy deposition. Therefore, a value of the depth in the target material of the radiation target assembly at the peak of the energy deposition may also be a in a range. In some embodiments, when the target material of the radiation target assembly is tungsten, the range of the thickness of the radiation target assembly may be the same as the depth in tungsten at a peak of energy deposition of tungsten. For example, the thickness of the radiation target assembly may be in a range of 0.3 mm~0.5 mm. In some embodiments, when the target material of the radiation target assembly is tungsten, the thickness of the radiation target assembly may be approximately the same as the depth in tungsten at the peak of energy deposition of tungsten. For example, the thickness of the radiation target assembly may be in a range of 0.2 mm~0.6 mm. In some embodiments, the thickness of the radiation target assembly may be any value within the above range. In some embodiments, the thickness of the radiation target assembly may be 0.5 mm.

The "A approximately the same as B" described in the embodiments of the present disclosure may mean that a difference between A and B is less than or equal to 10% of A or B, that is, the thickness of the radiation target assembly may be 90%-110% of the depth in the target material of the radiation target assembly at a peak of the energy deposition. An area, with the highest temperature and thickness within the range, in the radiation target assembly may be concentrated on the back surface of the radiation target assembly, which may facilitate heat dissipation through the heat dissipation assembly arranged on the back surface of the radiation target assembly.

Figure 4:
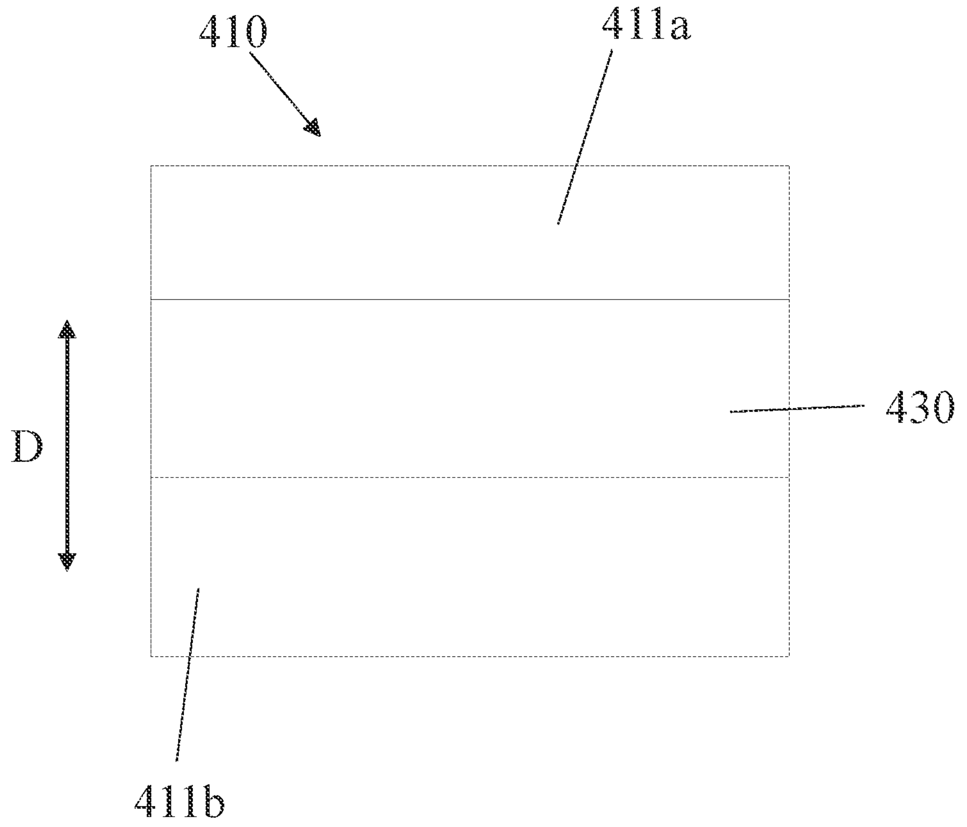
FIG. 4 is a schematic diagram illustrating an exemplary radiation target assembly and a heat dissipation assembly of a device for radiation ray generation according to some embodiments of the present disclosure.

FIG. 4 is a schematic diagram illustrating an exemplary radiation target assembly and a heat dissipation assembly of a device for radiation ray generation according to some embodiments of the present disclosure. The radiation target assembly 410 may include a plurality of target material layers arranged along the thickness direction (denoted by arrow D) of the radiation target assembly 410. The heat dissipation assembly 430 may include one or more heat dissipation layers arranged along the thickness direction (denoted by arrow D) of the radiation target assembly 410. As shown in FIG. 4, the radiation target assembly 410 may include two target material layers (also referred to as material layers) 411*a* and 411*b*. The heat dissipation assembly 430 may include one or more heat dissipation layers. The one or more heat dissipation layers may be arranged between the two target material layers 411*a* and 411*b*. The radiation target assembly 410 may be separated into a multi-layer structure by the one or more heat dissipation layers in the thickness direction. The two material layers 411*a* and 411*b* with a thinner thickness may further enhance the heat dissipation ability of the radiation target assembly 410. When the radiation target assembly 410 includes the plurality of target material layers arranged along the thickness direction of the radiation target assembly 410 and the heat dissipation assembly 430 includes the one or more heat dissipation layers arranged along the thickness direction of the radiation target assembly 410, the heat dissipation assembly 430 may be thermally connected with one of the plurality of target material layers. It should be noted that the two material layers 411*a* and 411*b* and the heat dissipation layers may be merely illustrated as an example, in some embodiments, the count of the material layers may exceed 2, such as equal to 3, 4, etc., and the count of the heat dissipation assemblies may exceed 1, such as 2, 3, 3, etc. The count of the material layers may be equal to or different from the count of the heat dissipation assemblies. In some embodiments, at least one of the two target material layers 411*a* and 411*b* may include one or more multiple sub-layers.

As shown in FIG. 4, the heat dissipation layers may be arranged between the two material layers 411*a* and 411*b*. In some embodiments, one of the one or more heat dissipation layers may be arranged between the two material layers 411*a* and 411*b*, and one of the one or more heat dissipation layers may be arranged at the back surface of the material layer 411*b*, in other words, each of the back surface of the two material layers 411*a* and 411*b* may be arranged with a hear dissipation layer. In some embodiments, the materials of the one or more heat dissipation layers may be the same, which may be made of a material with a small atomic number, such as copper, diamond, or the like. In some embodiments, the materials of the one or more heat dissipation layers may be different. For example, one of the one or more heat dissipation layers may be made of diamond, and another one of the one or more heat dissipation layers may be made of copper, or the like.

The total thickness of a plurality of material layers (e.g., the two target material layers 411*a* and 411*b*) may be determined based on the depth in the target material of the radiation target assembly 410 at the peak of the energy deposition of the target material of the radiation target assembly 410 under the irradiation of the electron beam with the predetermined energy. In some embodiments, the total thickness of the plurality of material layers may be 90%-110% of the depth in the target material of the radiation target assembly 410 at the peak of the energy deposition of the target material of the radiation target assembly 410. In some embodiments, the total thickness of the plurality of material layers may also be other proportional ranges (e.g., 95%-105%, or the like) of the depth in the target material of the radiation target assembly 410 at the peak of the energy deposition of the target material of the radiation target assembly 210. In some embodiments, the thickness of each of the plurality of material layers may be the same or different. In some embodiments, the thickness of each of the plurality of material layers may be changed from thick to thin along the irradiation direction of the radiation target assembly 410, so that a thickness of a material layer near a position corresponding to the depth in the target material of the radiation target assembly 410 at the peak of the energy deposition of the target material of the radiation target assembly 410 may be thinner, an energy deposited on the material layer may be less, and a temperature of the material layer may not be high. At the same time, the one or more heat dissipation layers connected with the material layer at the position may dissipate heat more easily, to achieve the goal of rapid cooling. In some embodiments, the thickness of each of the plurality of material layers may be changed from thin to thick along the irradiation direction.

In some embodiments, the thickness of one of the plurality of material layers may be not less than 0.1 mm. If the thickness of one material layer is too thin, few electrons may be absorbed by the plurality of material layers, thus the radiation dose rate may be low, and electron leakage may be more, thereby causing a serious electron pollution.

In some embodiments, a ratio of a thickness of one of the plurality of material layers to a thickness of one of the one or more heat dissipation layers may be 1:51:1. In some embodiments, the ratio of the thickness of one of the plurality of material layers to the thickness of one of the one or more heat dissipation layers may be 1:4~1:1. In some embodiments, the ratio of the thickness of one of the plurality of material layers 211 to the thickness of one of the one or more heat dissipation layers may be 1:4~1:2. In some embodiments, the ratio of the thickness of one of the plurality of material layers to the thickness of one of the one or more heat dissipation layers may be 1:4~1:3. In some embodiments, the ratio of the thickness of one of the plurality of material layers to the thickness of one of the one or more heat dissipation layers may be 1:3~1:2.

Since the total thickness of the target material of the radiation target assembly 410 is fixed, the more the count of the material layers are, the thinner the thickness of one of the plurality of material layers is, and the better the heat dissipation effect is. However, because the thickness of one of the plurality of material layers is too thin, which may cause more negative effect of electron leakage, the count of the material layers may not be too large. In some embodiments, the count of the material layers 211 may be 1~5.

In some embodiments, when the radiation target assembly 410 is a multi-layer structure along the thickness direction, the total thickness of the radiation target assembly 410 and the heat dissipation assembly) may be greater than the depth in the target material of the radiation target assembly 410 at the peak of the energy deposition of the target material of the radiation target assembly 100.

For example, as shown in FIG. 4, under the electron beam with an energy of 6 MV, the device for radiation ray generation may include three layers, including two of the target material layers (i.e., the two target material layers 411*a* and 411*b*) of the radiation target assembly and a heat dissipation layer of the heat dissipation assembly arranged between the two layers of the target material layers. Along the irradiation direction of the electron beam, a first layer may be the material layer (also referred to as target material layer 411*a*) (e.g., a tungsten layer), and a thickness of the first layer may be 0.3 mm. A second layer may be the heat dissipation layer (e.g., a copper layer), and a thickness of the second layer may be 0.6 mm. A third layer may be another material layer (e.g., a tungsten layer), and a thickness of the third layer may be 0.3 mm. In some embodiments, when the device for radiation ray generation with a three-layer structure includes two layers of the material layer and a heat dissipation layer arranged between the two layers of the target layer, the total thickness of the radiation target assembly with the two material layers may be the same or substantially the same as the depth in the target material of the radiation target assembly at the peak in the curve of the energy deposition of the target material under the irradiation of the electron beam with the predetermined energy.

In some embodiments, the materials of the plurality of heat dissipation layers may be different, and thicknesses of the plurality of heat dissipation layers made of different materials may also be different. In some embodiments, a thickness of a heat dissipation layer may be approximately linear with an atomic number or a density of a material of the heat dissipation layer.

Figure 5A:
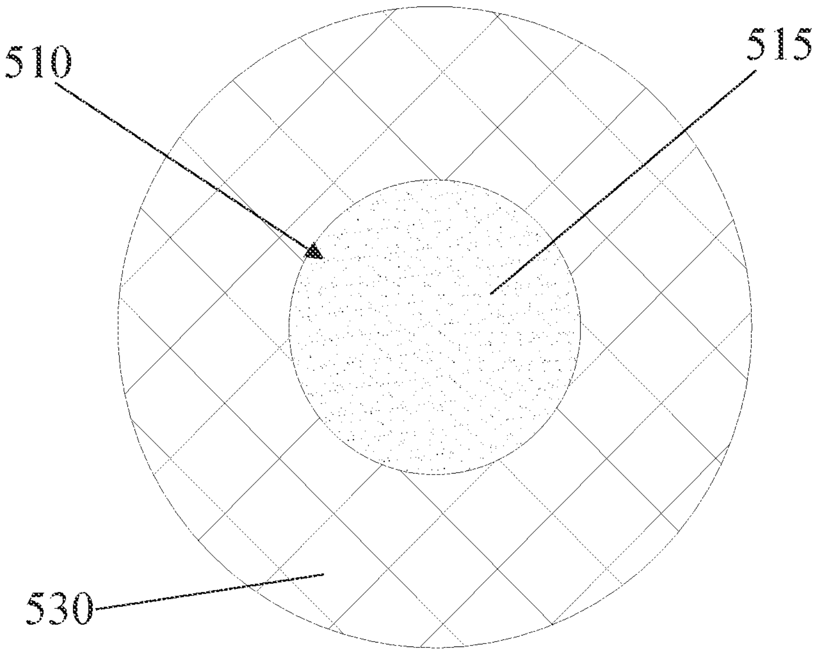
FIG. 5A is a schematic diagram illustrating another exemplary a radiation target assembly and a heat dissipation assembly of a device for radiation ray generation according to some embodiments of the present disclosure.
Figure 5B:
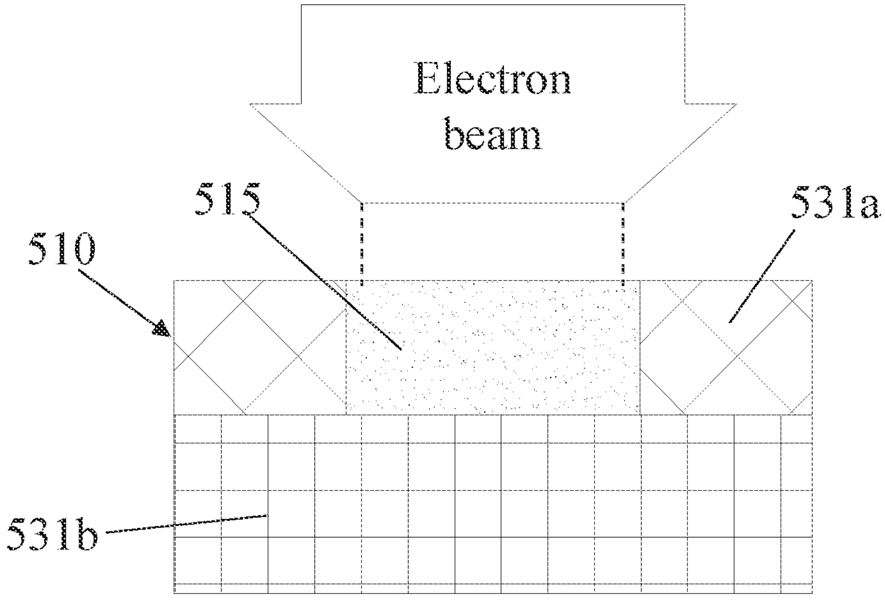
FIG. 5B is a schematic diagram illustrating an exemplary arrangement of the radiation target assembly and the heat dissipation assembly as shown in FIG. 5A according to some embodiments of the present disclosure.

FIG. 5A is a schematic diagram illustrating another exemplary radiation target assembly along the radial direction according to some embodiments of the present disclosure. FIG. 5B is a schematic diagram illustrating an exemplary arrangement of the radiation target assembly 510 and the heat dissipation assembly 530 as shown in FIG. 5A according to some embodiments of the present disclosure. As shown in FIG. 5A, the radiation target assembly 510 may include one or more material layers 515 arranged or stacked along a radial direction. The heat dissipation assembly 530 may include one more heat dissipation layers. As shown in FIG. 5B, the heat dissipation assembly 530 may include heat dissipation layers 531*a* and 531*b*. The heat dissipation layer 531*a* may surround one of the one or more material layers 515, in other words, the heat dissipation layer 531*a* may be arranged at the side surface (or outer surface) of the one of the one or more material layers 515. The heat dissipation layer 531*b* may be arranged at the back surface of the one or more material layers 515 (i.e., the radiation target assembly 510). It should be noted that the arrangement and/or the count of the one more heat dissipation layers and the one or more material layers may be not limited in FIG. 5B, for example, the one more heat dissipation layers may be all arranged at the side surface of the radiation target assembly 510 one by one. As another example, one of the one or more heat dissipation layers may be arranged between two of the one or more material layers of the radiation target assembly 510. The radiation target assembly may be separated into a multi-ring structure in the radial direction by the heat dissipation assembly 530. The one or more material layers 515 with a smaller width and the heat dissipation layer 531*a* surrounding the one or more material layers 515 may further enhance the heat dissipation ability of the radiation target assembly 510.

In some embodiments, the heat dissipation layer 531*b* may form or also be referred to as a first heat dissipation assembly that is arranged at the back surface of the radiation target assembly 510, and the heat dissipation layer 531*a* may form or also be referred to as a second heat dissipation assembly that is arranged at the side surface of the radiation target assembly 510. As shown in FIG. 5B, a projection shape of the radiation target assembly 510 or a heat dissipation assembly including the heat dissipation layer 531*b* (also referred to as the first heat dissipation assembly) 530 on a projection plane perpendicular to the thickness direction of the radiation target assembly 510 or the first heat dissipation assembly 530 may be circular, and the above-mention radial direction may refer to a radial direction of a circular section of the radiation target assembly 510 and or heat dissipation assembly 530. In some embodiments, the projection shape of the radiation target assembly 510 or the heat dissipation assembly 530 on the projection plane perpendicular to the thickness direction of the radiation target assembly 510 or the heat dissipation assembly 530 may also be square or other shapes. The above-mentioned radial direction may refer to a radial direction of a central axis of the projection shape of the radiation target assembly 510 or the heat dissipation assembly 530.

In some embodiments, a central region of the projection shape of the radiation target assembly 510 may be provided with the one or more material layer 515, and a periphery of the one or more material layers 515 in the central region may be provided with the heat dissipation assembly including the heat dissipation layer 531*a* (also referred to the second heat dissipation assembly), which may be arranged around a circumference of the one or more material layers 515. In some embodiments, a periphery of the second heat dissipation assembly 316 may also be surrounded by another material layer 515.

In some embodiments, the periphery of the one or more material layers 515 and the second heat dissipation assembly may also be provided with more multi-layer structures arranged in the radial direction, and a count of layers of the multi-layer structure may be three, four, five, or the like, which may not be limited in the present disclosure.

In some embodiments, related parameters of the material of one or more heat dissipation layers (also referred to as one or more second heat dissipation layers) of the second heat dissipation assembly may be the same as related parameters of the material of one or more heat dissipation layers of the first heat dissipation assembly. The more description may be found in elsewhere in the present disclosure.

In some embodiments, the material of one or more heat dissipation layers of the second heat dissipation assembly may be the same as the material of one or more heat dissipation layers of the first heat dissipation assembly, and a material with a small atomic number may be used, such as copper, diamond, or the like. In some embodiments, the material of one or more heat dissipation layers of the second heat dissipation assembly may also be different from material of the one or more heat dissipation layers of the first heat dissipation assembly. For example, the one or more heat dissipation layers of the first heat dissipation assembly may be made of copper, the one or more heat dissipation layers of the second heat dissipation assembly may be made of diamond, or the like.

It should be noted that when the material of the one or more heat dissipation layers of the second heat dissipation assembly may include diamond, a periphery of the diamond may be provided with a metal material coating with high heat conductivity (e.g., copper, etc.), and the second heat dissipation assembly may be welded with the material layer 515 or the substrate through the metal material coating.

In some embodiments, the second heat dissipation assembly may be physically connected with the first heat dissipation assembly (as shown in FIG. 5B), and the first heat dissipation assembly and the second heat dissipation assembly may jointly dissipate heat to the material layer 515 to enhance the heat dissipation effect. On the other hand, in some embodiments, since the second heat dissipation assembly between the two material layers 515 may be difficult to directly connect with the substrate, the heat may be transmitted to the substrate and be dissipated difficultly. At this time, the heat of the second heat dissipation assembly may be directed to the substrate through the heat dissipation assembly 530 by connecting the heat dissipation assembly 530 to dissipate heat.

In some embodiments, a minimum inner diameter of one of the one or more heat dissipation layers of the second heat dissipation assembly may be determined by a diameter of a spot generated by the electron beam irradiated on the radiation target assembly 510. In some embodiments, the minimum inner diameter of one of the one or more heat dissipation layers of the second heat dissipation assembly may refer to an inner diameter of one of the one or more heat dissipation layers of the second heat dissipation assembly near the central region of the radiation target assembly 510. Since the radiation target assembly 510 may be irradiated by the electron beam, an energy distribution in the radial direction of the radiation target assembly 510 may follow the Gaussian curve, that is, the closer to the center, the higher the energy is, and the higher the temperature is. Therefore, the smaller the inner diameter of one of the one or more heat dissipation layers of the second heat dissipation assembly is, the closer the one of the one or more heat dissipation layers of second heat dissipation assembly is to the center of the radiation target assembly 510, that is, the closer the second heat dissipation assembly is to the position with the highest temperature, the better the heat dissipation effect is.

In some embodiments, a range of a diameter of one of the one or more material layers 515 located in a central region of the radiation target assembly 510 may be 0.15 mm~0.25 mm. In some embodiments, the range of the diameter of one of the one or more material layers 515 located in the central region of the radiation target assembly 510 may be 0.15 mm~0.2 mm. In some embodiments, the diameter of one of the one or more material layers 515 located in the central region of the radiation target assembly 510 may be 0.2 mm. In some embodiments, the diameter of the material layer 515 located in the central region (i.e., an outer diameter of the material layer 515) of the radiation target assembly 510 may correspond to the inner diameter of the second heat dissipation assembly.

In the radial direction, since the photons of the radiation target assembly 110 are mainly generated by the one or more material layers 515 irradiated by the electron beam, in order to avoid affecting the radiation dose rate of the radiation target assembly 510, the second heat dissipation assembly may avoid being irradiated by the electron beam as much as possible, that is, the second heat dissipation assembly may be arranged outside the spot generated by the electron beam irradiated on the radiation target assembly 510 as much as possible (as shown in FIG. 5B).

It should be noted that the heat dissipation layer 531*b* of the first heat dissipation assembly is merely shown for illustration, and the counts of the heat dissipation layers of the first heat dissipation assembly may be not equal to 1, such as 2, 3, etc. The heat dissipation layer 531*a* of the second heat dissipation assembly is merely shown for illustration, and the counts of the heat dissipation layers of the second heat dissipation assembly may be not equal to 1, such as 2, 3, etc. In some embodiments, the minimum inner diameter of one of one or more heat dissipation layers of the second heat dissipation assembly may be greater than or equal to the diameter of the spot. At the same time, the second heat dissipation assembly may be arranged outside the spot, which may prevent the second heat dissipation assembly from being directly irradiated by the electron beam and melting due to the high temperature.

After the radiation target assembly 510 is irradiated by the electron beam, the energy distribution in the radial direction of the radiation target assembly 510 may follow the Gaussian curve, that is, the closer to the center region of the radiation target assembly 510, the higher the energy is, the farther from the center region of radiation target assembly 510, the lower the energy is. When a distance from the center region of the radiation target assembly 510 reaches a certain limit, the outward energy may decrease sharply. Therefore, in some embodiments, a count of the one or more material layers 515 and a count of the heat dissipation layers 531*a* of the second heat dissipation assembly of the radiation target assembly 510 may be one. In other embodiments, the radiation target assembly 510 may include a plurality of material layers 515 and a plurality of heat dissipation layers 531*a*. The plurality of material layers 515 and the plurality of heat dissipation layers 531*a* may be arranged with intervals.

For example, under the irradiation of the electron beam with an energy of 6 MV, the radiation target assembly 510 may include the material layer 515 located at the center of the radiation target assembly 510, and the heat dissipation layer 531*a* of the second heat dissipation assembly around the second target layer 515.

In some embodiments, a radial size of one of the one or more heat dissipation layers of the second heat dissipation assembly may be in a range of 0.2 mm~0.4 mm. In some embodiments, the radial size of the one of the one or more heat dissipation layers of the second heat dissipation assembly may be in a range of 0.25 mm~0.35 mm. In some embodiments, the radial size of the one of the one or more heat dissipation layers of the second heat dissipation assembly 316 may be in a range of 0.25 mm~0.3 mm. In some embodiments, the radial size of the one of the one or more heat dissipation layers of the second heat dissipation assembly 316 may be in a range of 0.3 mm~0.35 mm. It should be noted that the radial size of the one of the one or more heat dissipation layers of the second heat dissipation assembly 316 may refer to a difference between an outer radius and an inner radius of the one of the one or more heat dissipation layers of the second heat dissipation assembly 316, and a radial size of one of the one or more material layers 515 may refer to a radius of one of the one or more second materials layers 515.

In some embodiments, in order to further control the heat dissipation ability of the second heat dissipation assembly, a range of a ratio of the radial size of the one of the one or more heat dissipation layers of the second heat dissipation assembly to the radial size of one of the one or more material layers 515 may be 1:1~1:2. In some embodiments, a range of a ratio of the radial size of the one of the one or more heat dissipation layers of the second heat dissipation assembly to the radial size of one of the one or more material layers 515 may be 1:1.5~1:2. In some embodiments, a range of a ratio of the radial size of the one of the one or more heat dissipation layers of the second heat dissipation assembly to the radial size of one of the one or more material layers 515 may be 1:1~1:1.5.

In some embodiments, in the radial direction of the radiation target assembly 510, the one or more material layer 515 (e.g., a round tungsten layer, also referred to as a tungsten circle) may be within a radius of 0-0.2 mm of the radiation target assembly 310. The one of the one or more heat dissipation layers of the second heat dissipation assembly (e.g., an annular copper layer, also referred to as a copper ring) may be within a radius of 0.2-0.5 mm of the radiation target assembly 510.

Figure 6A:
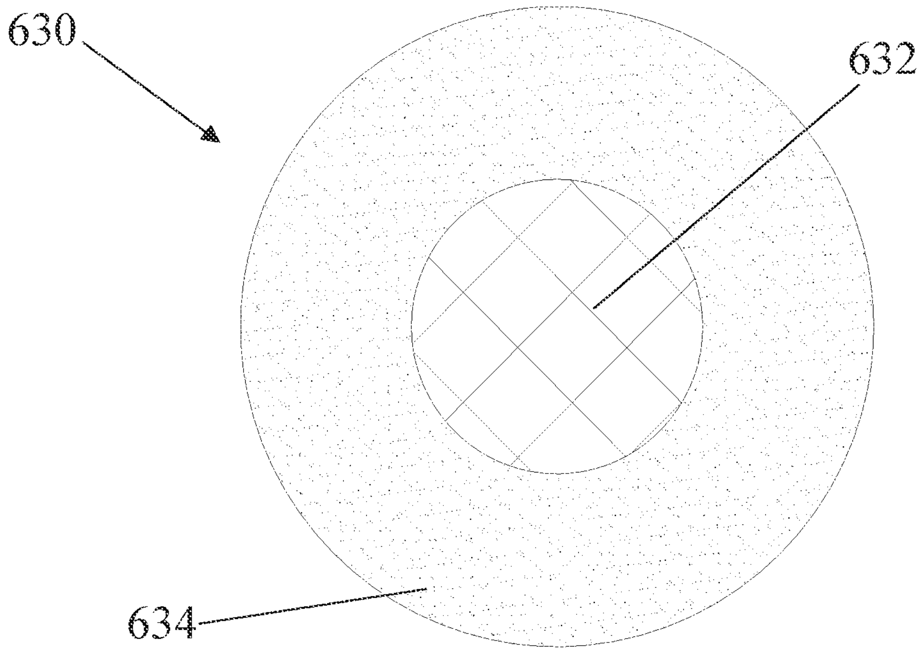
FIG. 6A is a schematic diagram illustrating an exemplary heat dissipation assembly according to some embodiments of the present disclosure.
Figure 6B:
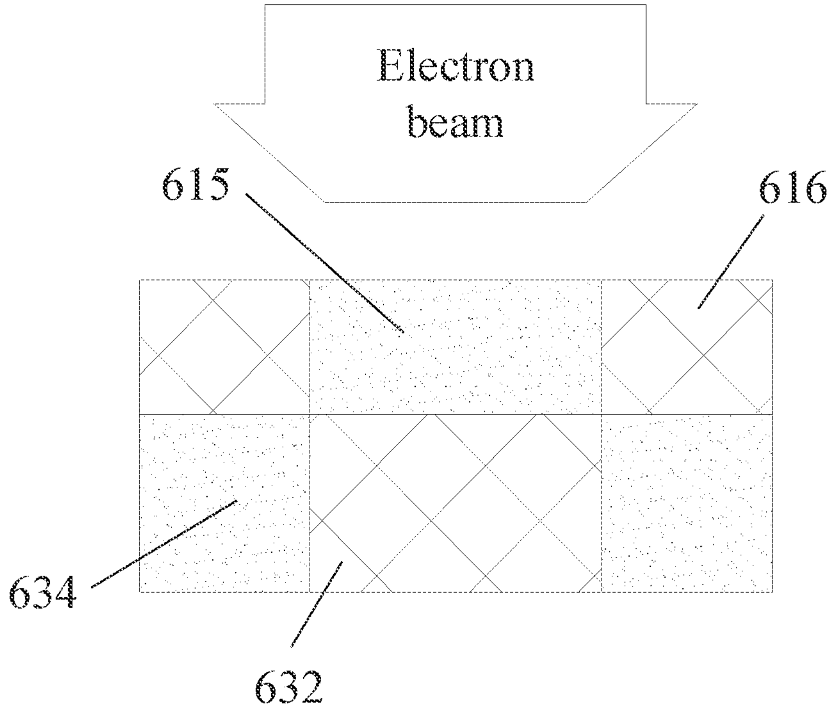
FIG. 6B is a schematic diagram illustrating an exemplary arrangement of a radiation target assembly and a heat dissipation assembly according to some embodiments of the present disclosure.

FIG. 6A is a schematic diagram illustrating an exemplary heat dissipation assembly according to some embodiments of the present disclosure. FIG. 6B is a schematic diagram illustrating an exemplary arrangement of a radiation target assembly and a heat dissipation assembly according to some embodiments of the present disclosure. In some embodiments, a device for radiation ray generation may include a radiation target assembly and a heat dissipation assembly. The radiation target assembly may include one or more target material layers. The heat dissipation assembly may include one or more heat dissipation assembly layers. The one or more heat dissipation assembly layers and the one or more target material layers may be arranged along the radial directions. For example, the one or more heat dissipation assembly layers may be arranged at the inner side surface or outer side surface (or inner wall or outer wall) of one of the one or more material layers of the radiation target assembly.

As shown in FIG. 6A, the heat dissipation assembly 630 may include one or more heat dissipation layers 632 arranged along a radial direction of the heat dissipation assembly 630. And one or more material layers 634 surrounding the one or more heat dissipation layers 632. In other words, the radiation target assembly including the one or more material layers 634 may be arranged at the side surface (or the outer surface) of the heat dissipation assembly 630. A radial structure of the heat dissipation assembly 630 may be similar to the radial structure of the radiation target assembly 510 illustrated in FIG. 5.

Under the irradiation of the electron beam with an energy of 6 MV, in the radial direction, within a range of a radius of 0-0.2 mm of a radiation target assembly, the one or more material layers (e.g., one or more tungsten circles) may be provided. Within a range of a radius of 0-0.2 mm of the heat dissipation assembly 630, the one or more heat dissipation layers 632 (e.g., one or more copper circles) may be provided. The one or more tungsten circles may correspond to the one or more copper circles. Within a range of a radius of 0.2-0.5 mm of the radiation target assembly, the one or more material layers (e.g., one or more tungsten rings) may be provided. Within a range of a radius of 0.2-0.5 mm of the heat dissipation assembly 630, the one or more heat dissipation layers 632 (e.g., one or more copper rings) may be provided. The one or more copper rings may correspond to the one or more tungsten rings.

In some embodiments, the radiation target assembly may have both a multi-layer structure in the thickness direction, and a multi-ring structure in the radial direction. That is, the plurality of material layers and the one or more heat dissipation layers may also have a multi-ring structure in the radial direction. For example, under the irradiation of the electron beam with an energy of 6 MV, along the irradiation direction of the electron beam, a first layer of the device for radiation ray generation may be a material layer, and a thickness of the first layer may be 0.3 mm. In the radial direction, within a range of a radius of 0-0.2 mm of the material layer, a tungsten circle may be provided, within a range of a radius of 0.2-0.5 mm of the material layer, a copper ring may be provided. A second layer of the device for radiation ray generation may be a heat dissipation layer, and a thickness of the second layer may be 0.6 mm. In the radial direction, within a range of a radius of 0-0.2 mm of the heat dissipation layer, a copper circle may be provided, within a range of a radius of 0.2-0.5 mm of the heat dissipation layer, a tungsten ring may be provided. In some embodiments, the device for radiation ray generation may further include a third layer. The third layer of the device for radiation ray generation may be another material layer, and a thickness of the third layer may be 0.6 mm. In the radial direction, within a range of a radius of 0-0.2 mm of the material layer, a tungsten circle may be provided, within a range of a radius of 0.2-0.5 mm of the material layer, a copper ring may be provided.

In some embodiments, a device for radiation ray generation may include a first radiation target assembly, a second radiation target assembly, a first heat dissipation assembly, and a second heat dissipation assembly. Each of the first radiation target assembly and the second radiation target assembly may include one or more target material layers. Each of the first heat dissipation assembly and the second heat dissipation assembly may include one or more heat dissipation assembly layers. The one or more target material layers of the first radiation target assembly and the one or more heat dissipation layers of the first heat dissipation assembly may be arranged at a first layer of the device for radiation ray generation and the one or more target material layers of the second radiation target assembly and the one or more heat dissipation layers of the second heat dissipation assembly may be arranged at a second layer of the device for radiation ray generation. The first layer and the second layer may be arranged or stacked along the thickness direction. For example, the first layer may be arranged under the second layer along the thickness direction. The target material layer of the first radiation target assembly may also be referred to as a first material layer and the target material layer of the second radiation target assembly may also be referred to as a second material layer. The heat dissipation layer of the first heat dissipation assembly may also be referred to as a first heat dissipation layer and the heat dissipation layer of the second heat dissipation assembly may also be referred to as a second heat dissipation layer. The first material layers and the first heat dissipation layers may be arranged along the radial direction in the first layer. The second material layers and the second heat dissipation layers may be arranged along the radial direction in the second layer. For example, the first material layers may be arranged at the side surface (e.g., the outer surface or the inner surface) of the first heat dissipation layers one by one. The second material layers may be arranged at the side surface (e.g., the outer surface or the inner surface) of the second heat dissipation layers one by one.

As shown in FIG. 6B, the first radiation target assembly may include a first material layer 634 and the first heat dissipation assembly may include a first heat dissipation layer 632. The first material layer 634 may be arranged at the outer surface of the first heat dissipation layer 632, such that the first material layer 634 may surround the first heat dissipation layer 632. The second radiation target assembly may include a second material layer 615 and the second heat dissipation assembly may include a second heat dissipation layer 616. The second material layer 615 may be arranged at the inner surface of the second heat dissipation layer 616, such that the second heat dissipation layer 616 may surround the second material layer 615. The first heat dissipation layer 632 may also be arranged at the back surface of the second material layer 615 along the thickness direction and the first material layer 634 may be arranged at the back surface of the second heat dissipation layer 616. Accordingly, a contact area between the material layers and the heat dissipation layers may be increased, thereby improving efficiency of the heat dissipation assemblies, further improving the stability and service life of the device for radiation ray generation. In the irradiation direction of the electron beam, each second material layer 4615 may correspond to a position of a first heat dissipation layer 632 (as shown in FIG. 6B).

In some embodiments, a range of a ratio of one of a thermal conductivity of the target material of the radiation target assembly and/or a thermal conductivity of the second radiation target assembly to one of a thermal conductivity of the material of one or more first heat dissipation layers of the first heat dissipation assembly and/or a thermal conductivity of the material of one or more second heat dissipation layers of the second heat dissipation assembly may be 1:3~1:10. In some embodiments, a range of a ratio of one of a photon dose rate of the target material of the radiation target assembly and/or a photon dose rate of the second radiation target assembly to one of a photon dose rate of the material of one or more first heat dissipation layers of the first heat dissipation assembly and/or a photon dose rate of the material of one or more second heat dissipation layers of the second heat dissipation assembly may be 1:0.5~1:0.9.

In some embodiments, the target material of the second radiation target assembly may be the same as the target material of the first radiation target assembly, and a total thickness of the target material of the second radiation target assembly may be determined based on a peak of a radiation dose rate of the target material of the second radiation target assembly. A thickness of the target material of the first radiation target assembly or the target material of the second radiation target assembly corresponding to a peak of a radiation dose rate of the target material of the first radiation target assembly or the target material of the second radiation target assembly under the irradiation of the electron beam with the predetermined energy may refer to a total thickness of the target material of the first radiation target assembly or the target material of the second radiation target assembly when a radiation dose rate of the target material of the radiation target assembly or the target material of the second radiation target assembly reaches a value of peak under the irradiation of the electron beam with the predetermined energy. In some embodiments, when the total thickness of the target material of the first radiation target assembly or the target material of the second radiation target assembly is less than a thickness of the target material of the first radiation target assembly or the target material of the second radiation target assembly corresponding to a peak of a radiation dose rate of the target material of the first radiation target assembly or the target material of the second radiation target assembly, the radiation dose rate of the device may increase with the increase of the total thickness of the target material of the first radiation target assembly or the target material of the second radiation target assembly in the device. When the total thickness of the target material of the first radiation target assembly or the target material of the second radiation target assembly is greater than the thickness of the target material of the first radiation target assembly or the target material of the second radiation target assembly corresponding to a peak of a radiation dose rate of the target material of the first radiation target assembly or the target material of the second radiation target assembly, the radiation dose rate of the device may decrease with the increase of the total thickness of the target material of the radiation target assembly or the target material of the second radiation target assembly in the device.

The target material of the second radiation target assembly may be the same as the target material of the first radiation target assembly, so that the second radiation target assembly and the first radiation target assembly 410 may absorb electrons to generate photons in the same way, facilitating a control of the radiation dose rate of the device. In some embodiments, the target material of the second radiation target assembly may also include tungsten.

In some embodiments, a sum of a total thickness of the target material of the second radiation target assembly and a total thickness of the target material of the first radiation target assembly may not be less than the thickness of the target material of the first radiation target assembly or the target material of the second radiation target assembly corresponding to the peak of the radiation dose rate of the target material of the radiation first target assembly or the target material of the second radiation target assembly under the irradiation of the electron beam with the predetermined energy (e.g., 6-15 MV), so that the first radiation target assembly and the second radiation target assembly may both have a performance with a higher radiation dose rate. In some embodiments, the sum of the total thickness of the target material of the second radiation target assembly and the total thickness of the target material of the first radiation target assembly may be equal to the thickness of the target material of the first radiation target assembly or the target material of the second radiation target assembly corresponding to the peak of the radiation dose rate of the target material of the first radiation target assembly or the target material of the second radiation target assembly under the irradiation of the electron beam with the predetermined energy (e.g., 6-15 MV), so that the radiation dose rate of the device may be at the highest level. In some embodiments, in order to further reduce the electron leakage rate of the device, the total thickness of the target material of the second radiation target assembly and the total thickness of the target material of the first radiation target assembly may be further increased. In some embodiments, the sum of the total thickness of the target material of the second radiation target assembly and the total thickness of the target material of the first radiation target assembly may be greater than the thickness of the target material of the radiation target assembly or the target material of the second radiation target assembly corresponding to the peak of the radiation dose rate of the target material of the first radiation target assembly or the target material of the second radiation target assembly under the irradiation of the electron beam with the predetermined energy (e.g., 6-15 MV). When the sum of the total thickness of the target material of the second radiation target assembly and the total thickness of the target material of the first radiation target assembly is greater than the thickness of the target material of the first radiation target assembly or the target material of the second radiation target assembly corresponding to the peak of the radiation dose rate of the first target material of the radiation target assembly or the target material of the second radiation target assembly, the radiation dose rate of the device may decrease compared with a value of the peak of the radiation dose rate. In some embodiments, the reduction of the radiation dose rate of the device may not exceed 20% of the peak of the radiation dose rate. That is, the reduced radiation dose rate may not be less than 80% of the peak of the radiation dose rate. At this time, the thickness of the target material of the first radiation target assembly or the target material of the second radiation target assembly corresponding to the radiation dose rate of the target material of the first radiation target assembly or the target material of the second radiation target assembly may be the sum of the total thickness of the target material of the second radiation target assembly and the total thickness of the target material of the first radiation target assembly. By setting the sum of the total thickness of the target material of the second radiation target assembly and the total thickness of the target material of the first radiation target assembly to be greater than the thickness of the target material of the first radiation target assembly or the target material of the second radiation target assembly corresponding to the peak of the radiation dose rate of the target material of the first radiation target assembly or the target material of the second radiation target assembly, the device may reduce the electron leakage rate and improve the overall performance of the device with a performance of a higher radiation dose rate.

In some embodiments, in order to ensure that the radiation dose rate of the device is not less than 80% of the peak of the radiation dose rate, and at the same time to minimize the electron leakage rate, according to a curve of radiation dose rate, the total thickness of the target material of the second radiation target assembly may not exceed 4 times of the thickness of the second radiation target assembly corresponding to the peak of the radiation dose rate of the target material of the second radiation target assembly under the irradiation of the electron beam with the predetermined energy.

In some embodiments, the second radiation target assembly may also include a multi-layer structure in a thickness direction of the second radiation target assembly, and a thickness of each second material layer in the multi-layer structure may not be less than 0.1 mm. In some embodiments, the second radiation target assembly may also include a multi-ring structure in a radial direction of the second radiation target assembly In some embodiments, the second radiation target assembly may include both a multi-layer structure in the thickness direction and a multi-ring structure in the radial direction. The more descriptions of the multi-layer structure in the thickness direction and the multi-ring structure in the radial direction of the second radiation target assembly may be found elsewhere in the present disclosure, and may not be repeated herein.

In some embodiments, a device for radiation ray generation may include a first radiation target assembly, a second radiation target assembly, and a heat dissipation assembly. Each of the first radiation target assembly and the second radiation target assembly may include one or more target material layers. Each of the first heat dissipation assembly and the second heat dissipation assembly may include one or more heat dissipation assembly layers. In some embodiments, the one or more target material layers of the first radiation target assembly may be arranged at a first layer of the device for radiation ray generation, and the one or more target material layers of the second radiation target assembly and the one or more heat dissipation layers of the second heat dissipation assembly may be arranged at a third layer of the device for radiation ray generation. The first layer, the second layer, and the third layer may be arranged or stacked along the thickness direction. For example, the first layer may be arranged above the second layer along the thickness direction, and the second layer may be arranged between the first layer and the third layer. The target material layer of the first radiation target assembly may also be referred to as a first material layer and the target material layer of the second radiation target assembly may also be referred to as a second material layer. The first material layers, the second material layers, and the heat dissipation layers may be arranged along the thickness direction.

In some embodiments, the thickness of the first radiation target assembly may account for 20% to 40% of a thickness of the device for radiation ray generation. In some embodiments, the thickness of the device for radiation ray generation may include a sum of the thickness of the first radiation target assembly and the thickness of the first heat dissipation assembly. In some embodiments, the thickness of the device for radiation ray generation may also include the sum of the thickness of the first radiation target assembly, the thickness of the first heat dissipation assembly, and the thickness of the second radiation target assembly.

Figure 7:
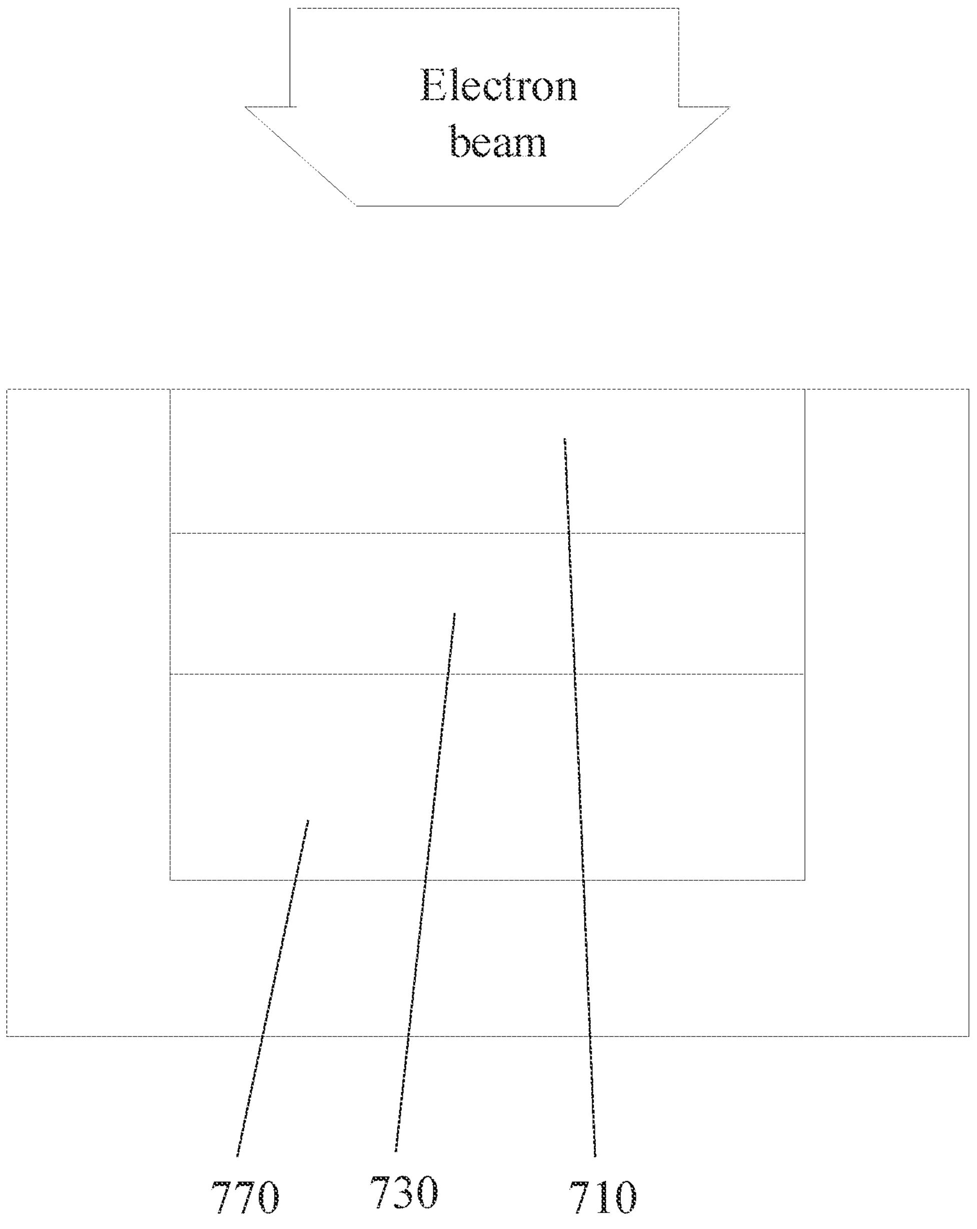
FIG. 7 is a schematic diagram illustrating an exemplary support of a device for radiation ray generation according to some embodiments of the present disclosure.

For example, FIG. 7 is a schematic diagram illustrating an arrangement of the radiation target assembly and the heat dissipation assembly according to some embodiments of the present disclosure. The second radiation target assembly 770 may absorb electrons of the electron beam to generate photons, thereby increasing the radiation dose rate of the device and reducing the electron leakage rate. More descriptions for the radiation target assembly and the heat dissipation assembly may be found elsewhere in the present disclosure.

FIG. 8 is a schematic diagram illustrating another exemplary device for radiation ray generation according to some embodiments of the present disclosure. As shown in FIG. 8, the device for radiation ray generation may include a substrate 890. The substrate 890 may be physically connected with the heat dissipation layer. The substrate 890 may be provided with a cooling water pipe 892. In some embodiments, the substrate 890 may be arranged around a radiation target assembly and a heat dissipation assembly (e.g., the radiation target assembly 110 and the heat dissipation assembly 130 illustrated in FIG. 1). In some embodiments, the substrate 890 may be arranged around the radiation target assembly, the heat dissipation assembly, and the second radiation target assembly (e.g., the radiation target assembly 110, the heat dissipation assembly 130, and the second radiation target assembly 150 illustrated in FIG. 1). In some embodiments, the substrate 890 may also be arranged around the radiation target assembly, the heat dissipation assembly, the second radiation target assembly, or a back surface of the second radiation target assembly.

In some embodiments, the substrate 890 may be configured to provide an installation platform for the radiation target assembly, the heat dissipation assembly and the second radiation target assembly. The substrate 890 may transmit the heat of the heat dissipation assembly to outside to enhance the heat dissipation effect.

In some embodiments, a material of the substrate 890 may include copper. On the one hand, the substrate 890 made of copper may have a performance of good thermal conductivity. On the other hand, a radiation target assembly, a heat dissipation assembly and a second radiation target assembly may be welded and fixed more conveniently.

In some embodiments, the substrate 890 may be provided with a plurality of cooling water pipes 892. The coolant may be flowed in the plurality of cooling water pipes 892. In some embodiments, the coolant may include deionized water, or a kind of organic coolant, such as methanol. On the one hand, the deionized water may not corrode the substrate 890, on the other hand, the deionized water may take away the heat of the substrate 890 and enhance the heat dissipation effect of the device for radiation ray generation. In some embodiments, the plurality of cooling water pipes 892 may be located around of the radiation target assembly, the heat dissipation assembly, and the second radiation target assembly, to avoid the plurality of cooling water pipes 892 from being irradiated by the electron beam, and avoid the adverse effect of the plurality of cooling water pipes 892 and the deionized water on the irradiation of the electron beam. In some embodiments, the plurality of cooling water pipes 892 may be arranged on an irradiation path of the electron beam. The arrangement of the plurality of cooling water pipes 892 may not be limited in the embodiments of the present disclosure.

In some embodiments, the materials of components (e.g., the first radiation target assembly, a second radiation target assembly, the heat dissipation assembly, or the like) of the device for radiation ray generation may be combinations of other materials. In some embodiments, the target materials of the radiation target assemblies of the device for radiation ray generation may also include tantalum or gold, and the material of the heat dissipation assembly may include copper or stainless steel.

In some embodiments, taking tantalum as the target material and copper as the material of the heat dissipation assembly, the device for radiation ray generation may include a first radiation target assembly, a second radiation target assembly, the heat dissipation assembly. In some embodiments, structures of the first radiation target assembly, the second radiation target assembly, the heat dissipation assembly (e.g., a thickness of each layer of the first radiation target assembly, the second radiation target assembly, or the heat dissipation assembly) may be determined based on descriptions described elsewhere in the present disclosure. Some specific structure may be provided in some embodiments below. In some embodiments, the first radiation target assembly may include a tantalum layer with a thickness of 0.2 mm. The heat dissipation assembly may include a copper layer with a thickness of 0.6 mm. The second radiation target assembly may include two tantalum layers and a copper layer placed between the two tantalum layers. A thickness of each of the two tantalum layers may be 0.2 mm, and a thickness of the copper layer placed between the two tantalum layers may be 0.4 mm. In other embodiments, the first radiation target assembly may include a tantalum layer with a thickness of 0.2 mm. The heat dissipation assembly may include a copper layer with a thickness of 1 mm. The second radiation target assembly may include two tantalum layers and a copper layer placed between the two tantalum layers. A thickness of a tantalum layer near the heat dissipation assembly of the two tantalum layers may be 0.4 mm, a thickness of the tantalum layer far from the heat dissipation assembly may be 0.2 mm, and a thickness of the copper layer placed between the two tantalum layers may be 0.5 mm. In some embodiments, a total thickness of all tantalum layers (including the thicknesses of all tantalum layers in the first radiation target assembly and the second radiation target assembly) in the device may be 0.6 mm~3 mm, and a total thickness of all copper layers (including the thicknesses of all copper layers in the first radiation target assembly, the heat dissipation assembly and the second radiation target assembly) in the device may be 1 mm~7 mm.

In some embodiments, taking tantalum as the target material of the radiation target assemblies and stainless steel as the material of the heat dissipation assembly, the device for radiation ray generation may include a first radiation target assembly, a heat dissipation assembly and a second radiation target assembly. In some embodiments, structures of the first radiation target assembly, the second radiation target assembly, the heat dissipation assembly (e.g., a thickness of each layer of the first radiation target assembly, the second radiation target assembly, or the heat dissipation assembly) may be determined based on descriptions described elsewhere in the present disclosure. Some specific structure may be provided in some embodiments below. In some embodiments, the first radiation target assembly may include a tantalum layer with a thickness of 0.2 mm. The heat dissipation assembly may include a stainless steel layer with a thickness of 1 mm. The second radiation target assembly may include a tantalum layer with a thickness of 0.8 mm. In other embodiments, the first radiation target assembly may include a tantalum layer with a thickness of 0.2 mm. The heat dissipation assembly may include a stainless steel layer with a thickness of 0.8 mm. The second radiation target assembly may include two tantalum layer and two stainless steel layers interlaced with the two tantalum layers. A thickness of the tantalum layer near the heat dissipation assembly of the two tantalum layers may be 1 mm, a thickness of the tantalum layer far from the heat dissipation assembly may be 0.2 mm. A thickness of the stainless steel layer between the two tantalum layers may be 1.5 mm, and a thickness of the stainless steel layer on the back of the tantalum layer far from the heat dissipation assembly may be 1 mm. In some embodiments, the total thickness of all tantalum layers (i.e., the total thicknesses of all tantalum layers in the first radiation target assembly and the second radiation target assembly) in the device may be 0.6 mm~3 mm, and the total thickness of all stainless steel layers (i.e., the total thickness of all copper layers in the first radiation target assembly, the heat dissipation assembly and the second radiation target assembly) may be 1 mm~7 mm.

In some embodiments, taking the target material of radiation target assemblies as gold and material of the heat dissipation assembly as copper, the device may include a first radiation target assembly, a heat dissipation assembly and a second radiation target assembly. In some embodiments, structures of the first radiation target assembly, the second radiation target assembly, the heat dissipation assembly (e.g., a thickness of each layer of the first radiation target assembly, the second radiation target assembly, or the heat dissipation assembly) may be determined based on descriptions described elsewhere in the present disclosure. Some specific structure may be provided in some embodiments below. In some embodiments, the first radiation target assembly may include a gold layer with a thickness of 0.4 mm. The heat dissipation assembly may include a copper layer with a thickness of 0.4 mm. The second radiation target assembly may include a gold layer and a copper layer arranged on the back of the gold layer of the second radiation target assembly. A thickness of the gold layer of the second radiation target assembly may be 0.8 mm, and a thickness of the copper layer of the second radiation target assembly may be 0.8 mm. In other embodiments, the first radiation target assembly may include a gold layer with a thickness of 0.2 mm. The heat dissipation assembly may include a copper layer with a thickness of 0.6 mm. The second radiation target assembly may include two gold layers and two copper layers interlaced with the two gold layers. A thickness of the gold layer near the heat dissipation assembly of the two gold layers may be 1 mm, a thickness of the gold layer far from the heat dissipation assembly may be 0.2 mm, a thickness of the copper layer between the two gold layers may be 1 mm, and a thickness of the copper layer on the back of the gold layer far from the heat dissipation assembly may be 0.2 mm. In some embodiments, the total thickness of all gold layers (i.e., the total thickness of all gold layers in the first radiation target assembly and the second radiation target assembly) of the device may be 0.6 mm~3 mm, and the total thickness of all copper layers (i.e., the total thickness of all copper layers of the first radiation target assembly, the heat dissipation assembly and the second radiation target assembly) may be 1 mm to 7 mm.

In some embodiments, taking the target material of the radiation target assemblies as tantalum and the material of the heat dissipation assembly as stainless steel, the first radiation target assembly may include two tantalum layers (the second material layer) arranged radially and two stainless steel layers (the second heat dissipation assembly) arranged at intervals with the two tantalum layers arranged radially. In some embodiments, a radius of the tantalum layer located in the center of the first radiation target assembly may be 0.3 mm, and along the radial direction, there may be the stainless steel layer with the radial dimension of 0.5 mm, the tantalum layer with the radial dimension of 1 mm, and the stainless steel layer with the radial dimension of 0.6 mm arranged successively outward. In other embodiments, the diameter of the tantalum layer at the center of the first radiation target assembly may be 0.4 mm, and along the radial direction, there may be stainless steel layers with a radial dimension of 1 mm, tantalum layers with a radial dimension of 0.6 mm, and stainless steel layers with a radial dimension of 1.5 mm. In some embodiments, a sum of the radial dimensions (i.e., the total radius) of the second material layer (tantalum layer) in the first radiation target assembly may be 0.6 mm~3 mm, and a sum of the radial dimensions (i.e., the total radius) of the second heat dissipation assembly (stainless steel layer) may be 1 mm~3 mm.

Figure 9:
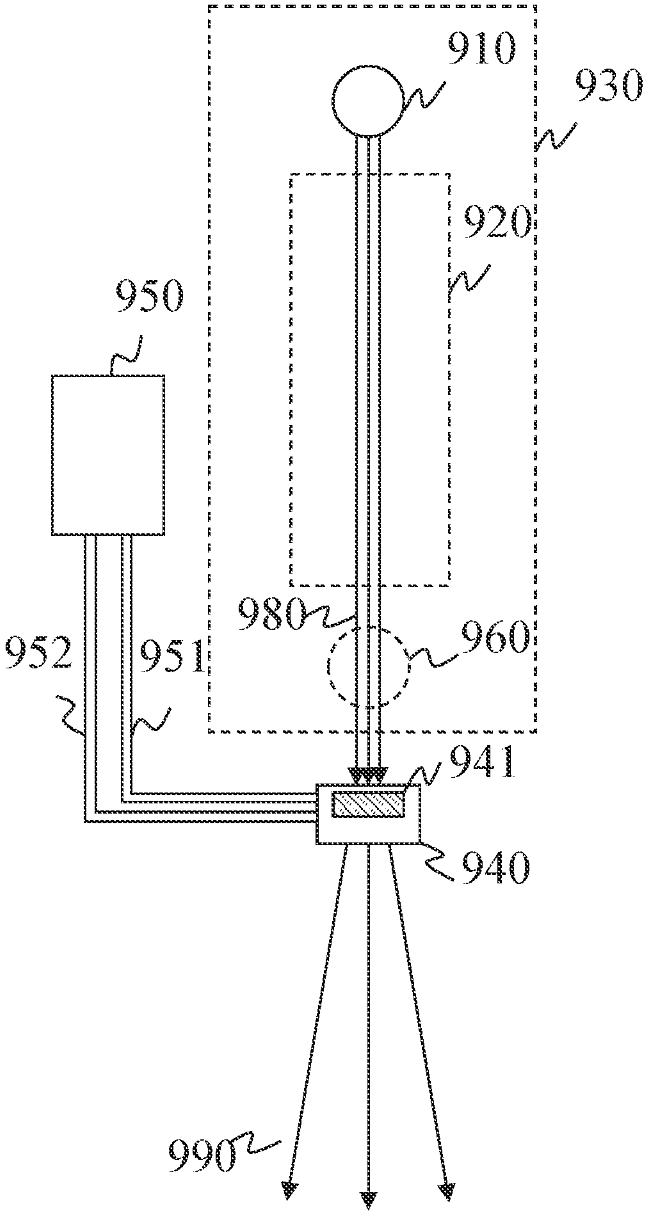
FIG. 9 is a schematic diagram illustrating an exemplary radiation apparatus according to some embodiments of the present disclosure.

FIG. 9 is a schematic diagram illustrating an exemplary radiation apparatus according to some embodiments of the present disclosure. The radiation apparatus 900 may generate radiation rays (e.g., radiation rays 990). The radiation apparatus 900 may be a linear accelerator as shown in FIG. 9. The radiation apparatus 900 may include an electron beam emission device and a device 940 for radiation ray generation.

The electron beam emission device may be used to generate an electron beam with a predetermined energy. The electron beam emission device may include an electron source 910 and a waveguide 920. The electron source 910 may emit electrons, and the electrons may be received by the waveguide 920 to form an electron beam 980. The electron source 910 may be an electron gun, which may include a heater, a cathode (a type of the cathode may be thermion or other type), a control gate (or a diode gun), a focusing electrode, an anode, and other components. The electron source 910 may be a cathode, such as a tungsten wire. The waveguide 920 may accelerate the received electrons to form an electron beam 980. The electron beam 980 formed after the acceleration of electrons may be emitted from the waveguide 920 and irradiated on the device 940. In some embodiments, the waveguide 920 may generate an oscillating electric field or a microwave energy pulse to accelerate the received electrons. The waveguide 920 may modulate electrons to a target energy level (e.g., a level of mega voltage). In some embodiments, the waveguide 920 may be omitted (e.g., when the radiation apparatus 900 is a tube structure). The acceleration of electrons may be performed by applying a positive voltage with respect to the electron source 910 (also referred to as a cathode) to the device 940 or a radiation target assembly 941 (also referred to as an anode). The electrons may then be accelerated towards the device 940 driven by electrostatic force, thereby forming an electron beam 980.

In some embodiments, the radiation apparatus 900 may include a vacuum enclosure 930. The vacuum enclosure 930 may provide a vacuum environment for the electron source 910, the waveguide 920, and other components of the radiation apparatus 900. The vacuum enclosure 930 may be sealed. In some embodiments, the radiation apparatus 900 may further include a vacuum pump (not shown in FIG. 9) to maintain a necessary vacuum in the vacuum enclosure 930. In some embodiments, the electron source 910 and the waveguide 920 may be located inside the vacuum enclosure 930.

The device 940 may include a radiation target assembly 941 (such as a first radiation target assembly and/or a second radiation target assembly). The more description of the device 940 may be similar to the device 100, which may be found elsewhere in the present disclosure, and may not be repeated herein. In some embodiments, the radiation apparatus 900 may further include additional components that facilitate radiation ray generation (e.g., an energy unit, an interface unit, a dosimeter, or the like). In some embodiments, the radiation apparatus 900 may optionally include a particle beam deflector 960. In some embodiments, the device 940 may be located inside or outside the vacuum enclosure 930.

In some embodiments, the radiation apparatus 900 may also include a cooling unit 950. The cooling unit 950 may deliver a cooling medium (e.g., water, air, oil) to the device 940 (e.g., to the cooling water pipe 892 illustrated in FIG. 8). The used cooling medium may be cooled and reused, or may be discharged into the environment (e.g., when air is used as the cooling medium). The cooling unit 950 may be arrange inside or outside a housing of the radiation apparatus 900. For example, the cooling unit 950 may be installed in the device 940. The cooling unit 950 may transmit a cooling medium through a conduit 951 and a conduit 952 and receive the used cooling medium. The conduit 951 and the conduit 952 may be connected with a cooling conduit or a cooling tube configuration (not shown in FIG. 9) of the device 940. Optionally, the cooling unit 950 may cool other components of the radiation apparatus 900, such as the electron source 910, the waveguide 920, or the like.

In some embodiments, the radiation apparatus 900 may include a particle beam deflector 260, which may change a direction of the electron beam 980. In some embodiments, when the electron beam 980 is emitted from the waveguide 920, the radiation target assembly 941 may be located outside the irradiation path of the electron beam 980. The particle beam deflector 960 may guide the direction of the electron beam 980 so that the electron beam 980 may reach the radiation target assembly 941.

It should be noted that the above description of the radiation apparatus 900 is merely for the convenience of description and does not limit the scope of the present disclosure. It should be understood that those skilled in the art may change the radiation apparatus 900 in an uninventive manner after understanding the main concepts and mechanisms of the present disclosure. These changes may include combining and/or splitting components, adding or removing optional components, or the like. All these modifications and changes are within the scope of the present disclosure.

The possible beneficial effects of the device for radiation ray generation disclosed in the present disclosure may include, but be not limited to: (1) based on the thickness of the radiation target assembly determined based on a peak of energy deposition of a target material of the radiation target assembly under the irradiation of the electron beam with the predetermined energy, the energy deposition of the radiation target assembly may be concentrated near the back surface of the radiation target assembly, thereby reducing a distance between the heat dissipation assembly and a position with the highest temperature in the radiation target assembly, enhancing the heat dissipation ability of the device for radiation ray generation, and extending the service life of the device for radiation ray generation; (2) arrangement of the multi-layer structure in the thickness direction and the multi-ring structure in the radial direction of the radiation target assembly may enhance the heat dissipation ability of the radiation target assembly; (3) arrangement of the plurality of cooling water pipe may enhance the heat dissipation ability of the substrate without affecting the irradiation of electron beam. It should be noted that different embodiments may have different beneficial effects. In different embodiments, the beneficial effects may be one or combination of the above, or any other beneficial effects that may be obtained.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Meanwhile, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of the present disclosure are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Contents of each of patents, patent applications, publications of patent applications, and other materials, such as articles, books, specifications, publications, documents, etc., referenced herein are hereby incorporated by reference, excepting any prosecution file history that is inconsistent with or in conflict with the present document, or any file (now or later associated with the present disclosure) that may have a limiting effect to the broadest scope of the claims. It should be noted that if the description, definition, and/or terms used in the appended materials of the present disclosure is inconsistent or conflicts with the content described in the present disclosure, the use of the description, definition and/or terms of the present disclosure shall prevail.

Finally, it should be understood that the embodiments described in the present disclosure merely illustrates the principles of the embodiments of the present disclosure. Other modifications may be within the scope of the present disclosure. Accordingly, by way of example, and not limitation, alternative configurations of embodiments of the present disclosure may be considered to be consistent with the teachings of the present disclosure. Accordingly, the embodiments of the present disclosure are not limited to the embodiments explicitly introduced and described by the present disclosure.

What is claimed is:

1. A device for radiation ray generation, comprising:

a radiation target assembly configured to generate radiation rays under irradiation of an electron beam with a predetermined energy, wherein the radiation target assembly is made of a target material, and the radiation rays are X-rays; and a heat dissipation assembly thermally connected with the radiation target assembly, wherein a ratio of a thickness of the radiation target assembly to a depth at a peak of energy deposition of the target material under the irradiation of the electron beam with the predetermined energy is in a range of 80%-120%.

2. The device of claim 1, wherein the thickness of the radiation target assembly is the same as a depth in the target material of the radiation target assembly at the peak of the energy deposition of the target material of the radiation target assembly under the irradiation of the electron beam with the predetermined energy.

3. The device of claim 1, wherein a ratio of a thickness of the heat dissipation layer to the thickness of the radiation target assembly is equal to a value in a range of 1:3~3:1.

4. The device of claim 1, wherein the radiation target assembly includes one or more target material layers, the heat dissipation assembly includes one or more heat dissipation layers, at least one of the one or more heat dissipation layers being arranged on a back surface of one of the one or more target material layers that is not under irradiation of an electron beam.

5. The device of claim 4, wherein the back surface of the one of the one or more target material layers includes a first concave-convex surface, the first concave-convex surface is axially symmetrical with respect to a central axis of the radiation target assembly, and the at least one of one or more heat dissipation layers includes a second concave-convex surface matched with the first concave-convex surface at a contact area between the one of the one or more target material layers and the at least one of the one or more heat dissipation layers.

6. The device of claim 4, wherein the one or more target material layers are arranged along a thickness direction, at least one of the one or more heat dissipation layers is arranged between two target material layers among the one or more target material layers, and the thickness direction is a direction pointing from a irradiation surface to a back surface of the radiation target assembly.

7. The device of claim 6, wherein a thickness of the one of the one or more target material layers is not less than 0.1 mm.

8. The device of claim 4, wherein a ratio of the thickness of the one of the one or more target material layers to a thickness of one of the one or more heat dissipation layers is in a range of 1:5~1:1.

9. The device of claim 4, further comprising:

a second radiation target assembly thermally connected with one of the one or more heat dissipation layers away from each of the one or more target material layers of the radiation target assembly.

10. The device of claim 9, wherein a target material of the second radiation target assembly is the same as the target material of the radiation target assembly, and a peak of a radiation dose rate of the target material of the second radiation target assembly is determined based on a total thickness of the target material of the second radiation target assembly.

11. The device of claim 10, wherein a sum of a total thickness of the target material of the second radiation target assembly and a total thickness of the target material of the radiation target assembly is equal to a value not less than a thickness of the target material of the radiation target assembly or not less than a thickness of the target material of the second radiation target assembly.

12. The device of claim 11, wherein the total thickness of the target material of the second radiation target assembly is equal to a value larger than 4 times of the thickness of the second radiation target assembly.

13. The device of claim 9, further comprising:

a second heat dissipation assembly including one or more second heat dissipation layers.

14. The device of claim 9, wherein a ratio of one of a thermal conductivity of the target material of the radiation target assembly and a thermal conductivity of the target material of the second radiation target assembly to one of a thermal conductivity of the material of one of the one or more heat dissipation layer and a thermal conductivity of the material of one of the one or more second heat dissipation layer is in a range of 1:3~1:10.

15. The device of claim 9, wherein a ratio of one of a photon dose rate of the target material of the radiation target assembly or a photon dose rate of the target material of the second radiation target assembly to one of a photon dose rate of the material of one of the one or more heat dissipation layer or a photon dose rate of the material of one of the one or more second heat dissipation layer is in a range of 1:0.5~1:0.9.

16. The device of claim 4, wherein the one or more target material layers of the radiation target assembly are arranged along a radial direction, and at least one of the one or more heat dissipation layers surrounds one of the one or more target material layers.

17. The device of claim 16, wherein a diameter of one of the one or more target material layers located in a central region of the radiation target assembly is in a range of 0.15~0.25 mm.

18. The device of claim 16, wherein a ratio of a radial size of one of the one or more heat dissipation layers to a radial size of one of the one or more target material layers is in a range of 2:1~3:1.

19. The device of claim 1, wherein the target material of the radiation target assembly is tungsten, the predetermined energy is in a range of 6 MV~15 MV, the thickness of the radiation target assembly is in a range of 0.2 mm~0.6 mm.

20. A radiation apparatus, comprising:

an electron beam emission device, configured to generate an electron beam with a predetermined energy; and a device for radiation ray generation, including:

a radiation target assembly configured to generate radiation rays under irradiation of the electron beam with the predetermined energy, wherein the radiation target assembly is made of a target material, and the radiation rays are X-ray; and a heat dissipation assembly thermally connected with the radiation target assembly, wherein a ratio of a thickness of the radiation target assembly to a depth at a peak of energy deposition of the target material under the irradiation of the electron beam with the predetermined energy is in a range of 80%-120%.

* * * * *